United States Patent [19]
Blum et al.

[11] Patent Number: 5,974,114
[45] Date of Patent: Oct. 26, 1999

[54] METHOD AND APPARATUS FOR FAULT TOLERANT CALL PROCESSING

[75] Inventors: Andrea G. Blum, Middletown; Paul A. Potochniak, Jackson, both of N.J.

[73] Assignee: AT&T Corp, New York, N.Y.

[21] Appl. No.: 08/937,762

[22] Filed: Sep. 25, 1997

[51] Int. Cl.[6] .............................. H04M 1/24; H04M 7/00; H04M 3/00; G06F 11/00
[52] U.S. Cl. .............................. 379/9; 379/221; 379/269; 370/217; 714/6; 714/17
[58] Field of Search ................................ 379/1, 9, 10, 14, 379/15, 32, 34, 219–221, 268, 269, 279; 370/216, 217, 220; 395/182.04, 181, 182.07, 182.08, 182.09; 714/5, 6, 10, 11

[56] References Cited

U.S. PATENT DOCUMENTS

| | | | |
|---|---|---|---|
| 4,914,572 | 4/1990 | Bitzinger et al. | 379/10 |
| 4,949,373 | 8/1990 | Baker, Jr. et al. | 379/266 |
| 5,182,750 | 1/1993 | Bales et al. | 370/217 |
| 5,661,719 | 8/1997 | Townsend et al. | 370/216 |
| 5,848,128 | 12/1998 | Frey | 379/9 |
| 5,883,939 | 3/1999 | Friedman et al. | 379/9 |

OTHER PUBLICATIONS

IEEE publication 0018–9162/97, *Computer*, "Software–Based Replication for Fault Tolerance", Rachid Guerraoui and Andre Schiper, pp. 68–74.

*Primary Examiner*—Paul Loomis

[57] ABSTRACT

A method and apparatus for processing call data. A first server in active mode replicates call data to a second server in standby mode. The first server is monitored for a fault condition by the second server, as well as other network devices. If a fault condition is detected, the first server is switched to standby mode and the second server to active mode.

23 Claims, 7 Drawing Sheets

METHOD AND APPARATUS FOR FAULT TOLERANT CALL PROCESSING

FIELD OF THE INVENTION

The invention relates to a call processing in general. More particularly, the invention relates to a method and apparatus for automatically switching call processing from an active call processor to a standby call processor in the event the active call processor fails.

BACKGROUND OF THE INVENTION

Given the current state of telephony technology, telephone calls over modern telecommunications networks are relatively reliable in terms of speed in completing a call connection, meeting quality of service requirements, and maintaining a call connection during the course of a conversation. The last category, maintaining a call connection, is provided in large part by building redundancy into the network, especially in the call processing platform. The call processing platform generally controls the set-up and shutdown of a call connection, and ensures that billing for a call is accurately maintained. This redundancy in the call processing platform ensures that a call connection is maintained even if there is a hardware failure in the equipment used to establish the call connection, and is sometimes referred to as "fault tolerant call processing."

Conventional technology and methods to build redundancy in a call processing platform, however, are less than desirable for a number of reasons. For example, a call processing platform typically has a call control computer that is responsible for implementing call flow by coordinating and assigning the resources of the other platform components, such as a switching matrix, voice response computers, and data base computers. Given its central function, the operation of the call control computer is extremely important in maintaining a call connection. Consequently, the call control computer is typically a specialized computer designed with redundant hardware components, such as a back-up microprocessor, memory, power supply, and so forth. This specialized call control computer, however, is very expensive. In addition, a single call control computer, even with redundant hardware, is susceptible to common mode failure. Common mode failure occurs when a single failure of a system component causes total system failure to occur. Further, the specialized call control computer is difficult to upgrade and maintain.

In an attempt to avoid the above problems, some call processing platforms utilize multiple call control computers, rather than a single dedicated call control computer with redundant hardware. The use of multiple call control computers, however, poses a new set of problems. Typically, one of the call control computers is designated as an active call control computer, with a second designated a standby call control computer. The active call control computer actively controls call processing functions for the call processing platform, while the standby call control computer stands ready to take over control of the call processing platform in the event the active call control computer experiences a hardware or software failure. To ensure that calls are not dropped when the active call control computer fails, it becomes necessary to duplicate all call processing data to the standby call control computer. Further, it becomes necessary to implement a monitoring scheme to monitor the active call control computer, and determine when it becomes necessary to switch over to the standby call controller.

Conventional techniques exist for duplicating call processing data from an active call control computer to a standby call control computer, such as the technique disclosed in a paper authored by Rachid Guerraoui et al. Titled "Software Based Replication for Fault Tolerance," Computer Journal, IEEE, April 1997. The technique described in the Guerraoui paper, however, is unsatisfactory for a number of reasons. For example, the Guerraoui paper fails to disclose a monitoring and switch over scheme that minimizes dropped calls in the case of failure of the active call control computer. Further, the Guerraoui paper fails to disclose a means for synchronizing the call processing data across the call processing platform.

In addition, the Guerraoui paper fails to teach how to ensure that the standby computer has accurate records regarding static call data. Typically, a call processing platform requires two types of data to process a call: (1) dynamic call data; and (2) static call data. Dynamic call data is information about the caller or call connection that changes for every call. For example, a destination telephone number is considered dynamic call data since it typically changes from call to call. Static call data is information about a caller that is relative stable, that is, it does not change on a call by call basis. An example of static call data would be a billing address for a caller, or perhaps a Personal Identification Number. The Guerraoui paper fails to discuss the duplication of static call data to the standby call control computer.

In view of the foregoing, it can be appreciated that a substantial needs exists for a fault tolerant call processing method and apparatus that solves the above-discussed problems.

SUMMARY OF THE INVENTION

The present invention includes method and apparatus for processing call data. A first server in an active mode replicates call data to a second server in a standby mode. The first server is monitored for a fault condition by the second server, as well as other network devices. If a fault condition is detected, the first server is switched to standby mode and the second server to active mode.

With these and other advantages and features of the invention that will become hereinafter apparent, the nature of the invention may be more clearly understood by reference to the following detailed description of the invention, the appended claims and to the several drawings attached herein.

DETAILED DESCRIPTION

Figure 1:
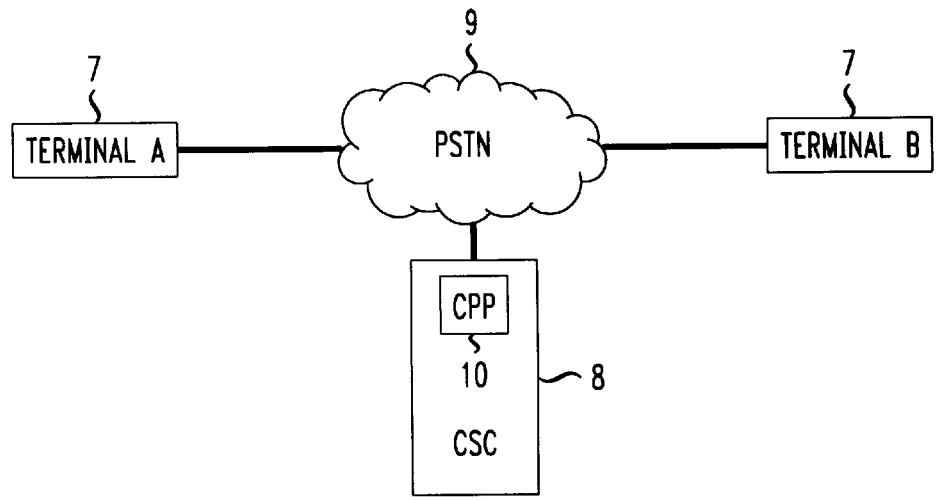
FIG. 1 illustrates a communications system suitable for practicing one embodiment of the invention.

The invention includes a method and apparatus for fault tolerant call processing. More particularly, the invention includes a method and apparatus for automatically switching from an active call control computer to a standby call control computer in the event of a hardware or software failure of the active call control computer, without interrupting active call connections being processed by the active call control computer. Two key elements required to perform this automatic switch over are call data synchronization and communications monitoring.

One embodiment of the invention comprises a call processing platform built upon general purpose computer devices. The general purpose, non-specialized computing devices are combined with voice response units (VRUs) and a switching matrix to create a distributed, fault tolerant, easily maintained call processing platform that provides high service availability through the use of "hot" standby sparing, full data sharing, database replication and synchronization, and a software-based distributed monitoring system. It is worthy to note that although the distributed monitoring system of this embodiment of the invention is implemented in software, it can be appreciated that the distributed monitoring system could be implemented in hardware or software and still fall within the scope of the invention.

The call processing platform performs call control and resource management using general purpose, non-specialized computer devices. The use of general purpose, non-specialized computer devices significantly reduces the cost of the call processing platform in general, and the call control computers in particular. This embodiment of the invention utilizes a pair of general purpose, non-specialized computer devices as call control computers, with one of the computers actively controlling call processing for the call processing platform ("active call control computer"), and with the other placed in a standby mode ("standby call control computer") and ready to assume call processing responsibilities in the event the active call control computer experiences a hardware or software failure.

Switching from the active call control computer to the standby call control computer can be performed on demand or automatically in the event of failure of the active call control computer. The on-demand "active/standby switch over" of the call control computers permits a platform administrator to request either an ON_DEMAND GRACEFUL switch over or an ON_DEMAND QUICK switchover. The ON_DEMAND GRACEFUL switch over resynchronizes the entire call processing platform by temporarily halting call processing and cleaning up all currently utilized switch resources. The ON_DEMAND QUICK switch over operates similar to the automatic active/standby switch over described below.

The automatic active/standby switch over of the call control computers is accomplished utilizing two key elements. The first key element is platform monitoring. The second key element is synchronizing call state information.

Platform monitoring is accomplished using distributed monitors for the call control computers and other critical processes. Each call control computer is equipped with a communications monitor for monitoring the internal processes for the call control computer, as well as the health of the other network devices that are part of the call processing platform. In addition, each network device is equipped with a communications monitor for monitoring the internal processes of each network device, as well as the call control computers. Each communications monitor can detect failure of the device that is running the monitor, as well as the failure of other devices external to the device running the monitor. Thus, each network device, including the call control computers, is capable of detecting device failures and reporting the device failures to the active call control computer. Additionally, each communications monitor remote to the active call computer can detect or confirm communication failure of the active call control computer and alert the standby call control computer of the need for a possible takeover.

In this embodiment of the invention, platform monitoring is accomplished through the use of two sets of monitoring processes. These processes monitor the platform for hardware and software failure so that call processing is maintained by activating the standby call control computer upon the failure of the active call control computer.

The first set of monitoring processes are referred to as High Availability Daemon (HAD) processes. The HAD processes run on the call control computers, with one HAD per computer. The HADs are responsible for: (1) coordinating startup and shutdown of call processing on the platform; (2) tracking the health of applications local to their own processors; (3) tracking the communication status and system state of the other platform components; and (4) monitoring the health of each other's call control computer. The HAD process is described in more detail with reference to FIGS. 3, 5(a) and 5(b).

The second set of monitoring processes are referred to as Monitor Service (MON) processes. The MON processes runs on the other components of the platform, e.g., VRUs and database computer. Each component has one MON process. In general, MONs are responsible for: (1) tracking the health of the application local to their own processor; (2) reporting the state of the local processor to the two call control computers; and (3) directing call flow to the active call control computer. The MON process is described in more detail with reference to FIGS. 3, 6(a) and 6(b).

If any of the monitoring processes (HADs or MONs) detects a failure that affects the call processing capabilities of the active call control computer, they register a vote-to-switch with the standby call control computer. Upon receiving two such votes the standby activates. First the standby tells its (formerly active) mate call control computer to enter a standby mode. Then the standby informs the other platform components to redirect the call flow to it as the newly active call control computer.

The other key component of the automatic active/standby switch over is the fully associated synchronization of each call state data structure contained on the active call control computer with its replicated call state data structure on the standby call control computer. As part of normal operation the call control computer maintains call information on a per call basis, i.e., dynamic call data. This information deals with switch and VRU resources currently assigned to a call, and caller data such as a target number and billing instrument (e.g., calling card) data. As this information is collected by the active call control computer from the other platform elements, the data is synchronized in real time to the standby call control computer. By this method, the standby call control computer always has all call information necessary to continue call processing should the monitoring processes determine that the active has failed.

Thus, the call control computers are fully synchronized with respect to call data used for the call processing. The active call control computer immediately shares all call state updates with the hot standby so that upon the active's failure, the standby can accept re-directed call flow with minimal loss of active calls or queuing delay.

Database synchronization and replication of static call data is also performed for both call control computers. a database computer stores static call data in a static call data profile, and then replicates the static call data onto both the active and standby call control computers whenever the static call data is accessed or modified. This ensures that should data be lost on any unit, it may be easily recovered from a replication. The replication of static call data for this embodiment of the invention utilizes an Advanced Replication product provided by Oracle Corporation. The call server copies of the database are read-only, and propagated to the call servers using Oracle's Read-Only Snapshots product.

Periodic data audits of dynamic and static call data records on both call control computers are performed to confirm that all data is synchronized. This ensures that both call control computers have updated call records regarding a particular call so that the call is not dropped in the event of a failure by the active call control computer.

Referring now in detail to the drawings wherein like parts are designated by like reference numerals throughout, there is illustrated in FIG. 1 a communications system suitable for practicing one embodiment of the invention. As shown in FIG. 1, terminals A and B (each labeled number 7) are connected to a Public Switched Telephone Network (PSTN) 9. PSTN 9 is also connected to a Call Servicing Center (CSC) 8. A calling party initiates a telephone call from terminal A. The call is processed by CSC 8, and a call connection is completed to the called party at terminal B via PSTN 9. CSC 8 includes a call processing platform (CPP) 10 that is described in more detail with reference to FIG. 2.

Figure 2:
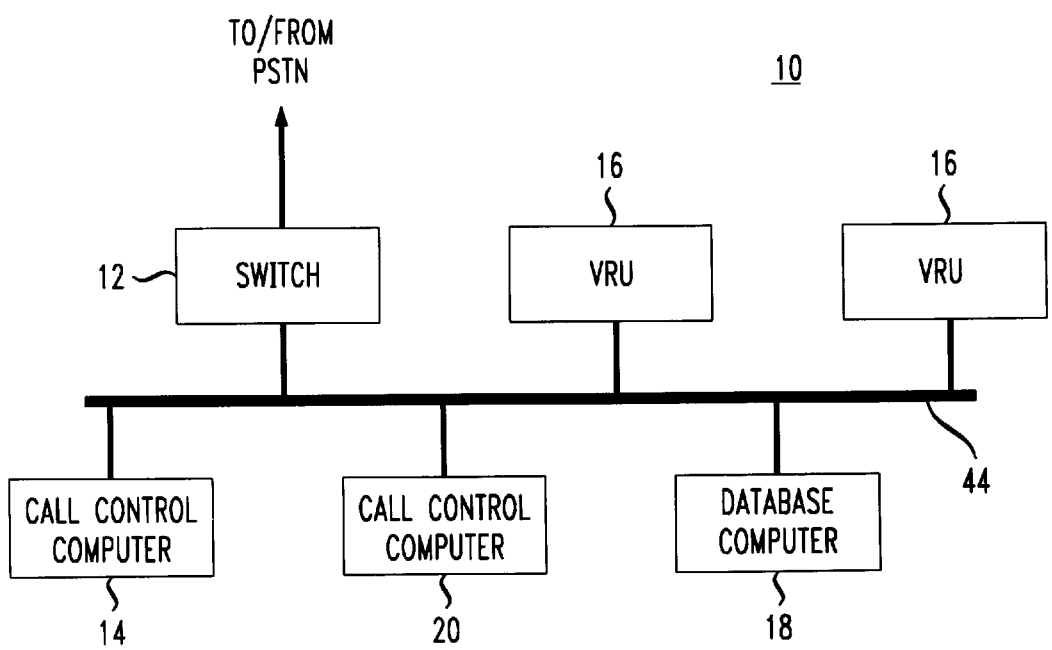
FIG. 2 illustrates a call processing platform in accordance with one embodiment of the invention.

FIG. 2 illustrates a call processing platform in accordance with one embodiment of the invention. A CPP 10 includes a computer controlled switching matrix 12, a first call control computer 14, a second call control computer 20, a plurality of VRUs 16, and a database computer 18.

Switching matrix 12 interfaces with a pair of call control computers via local area network (LAN) 44. Switching matrix 12 is responsible for providing all network terminations to the PSTN.

Call control computers 14 and 20 are responsible for the implementation of call flow between an origination number and a destination number. Call control computers 14 and 20 coordinate and assign the resources of the other platform components such as switch 12, VRUs 16 and database computer 18. Each call control computer has an active mode and a standby mode. A call control computer in active mode actively controls call processing for CPP 12, while the other call computer is placed in standby mode as a back-up to the call control computer in active mode.

VRUs 16 are computers capable of providing speech and touch tone resources used to interact with the caller. VRUs 16 are connected to switching matrix 12 via a network such as an Integrated Services Digital Network Primary Rate Interface (ISDN-PRI), and to call control computer 14 over another network, such as LAN 44.

Database computer 18 is a general purpose computer containing a relational database for use in call processing. Database computer 18 is connected to the call control computers via LAN 44.

Figure 3:
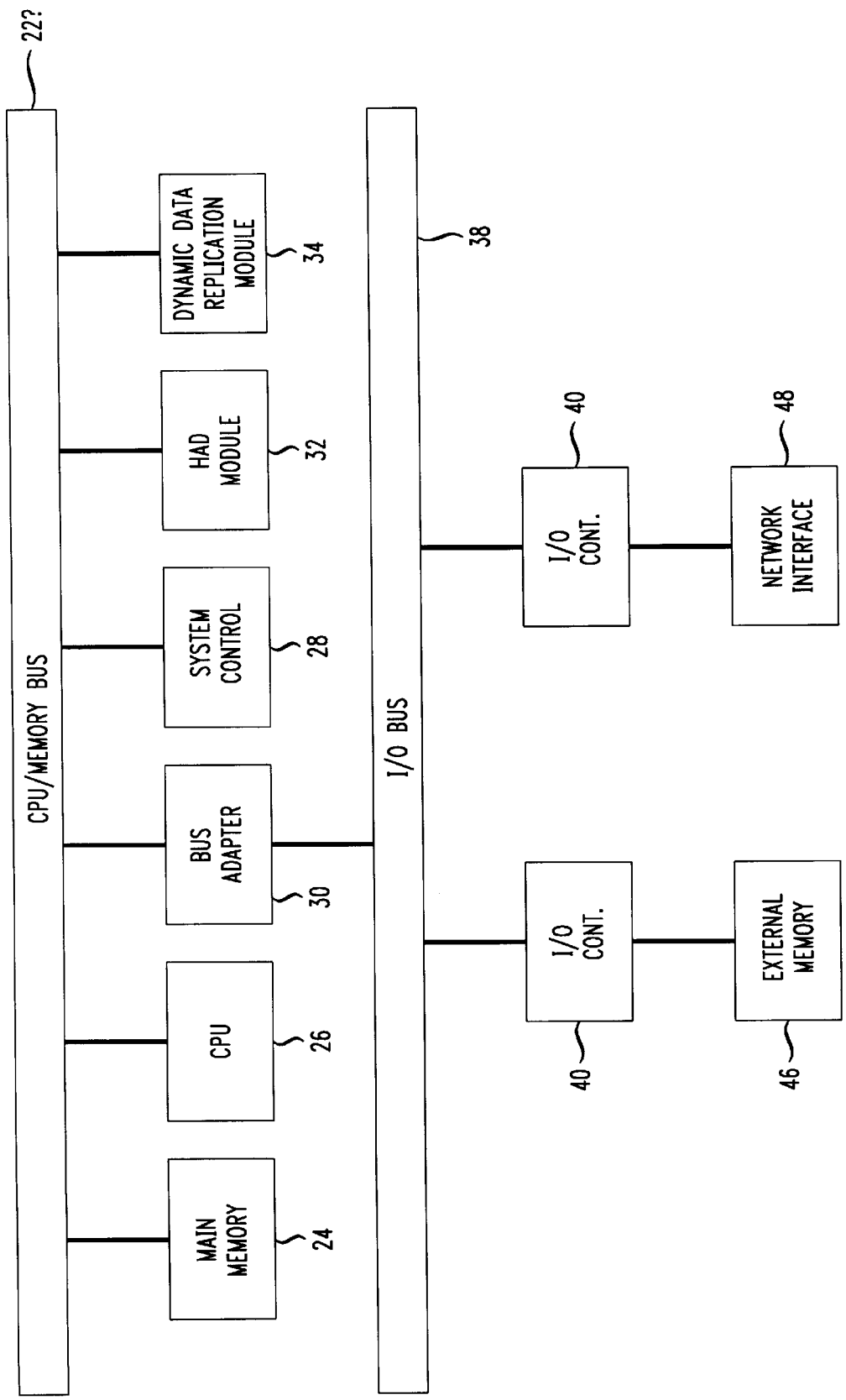
FIG. 3 is a block diagram of a call control computer in accordance with one embodiment of the invention.

FIG. 3 is a block diagram of a call control computer in accordance with one embodiment of the invention. For purposes of clarity, the following description will make reference to call computer 14. Call control computers 14 and 20 are similar, however, and therefore any discussion regarding one call control computer is equally applicable to the other call control computer.

Call control computer 14 comprises a main memory module 24, a central processing unit (CPU) 26, a system control module 28, a bus adapter 30, a High Availability Daemon (HAD) module 32, and a dynamic data replication module 34 each of which is connected to a CPU/memory bus 22 and an Input/Output (I/O) bus 38 via bus adapter 30. Further, call control computer 20 contains multiple I/O controllers 40, as well as a external memory 46 and a network interface 48, each of which is connected to I/O bus 38 via I/O controllers 40.

The overall functioning of call control computer 14 is controlled by CPU 26, which operates under the control of executed computer program instructions that are stored in main memory 24 or external memory 46. Both main memory 24 and external memory 46 are machine readable storage devices. The difference between main memory 24 and external memory 46 is that CPU 26 can typically access information stored in main memory 24 faster than information stored in external memory 36. Thus, for example, main memory 24 may be any type of machine readable storage device, such as random access memory (RAM), read only memory (ROM), programmable read only memory (PROM), erasable programmable read only memory (EPROM), electronically erasable programmable read only memory (EEPROM). External memory 46 may be any type of machine readable storage device, such as magnetic storage media (i.e., a magnetic disk), or optical storage media (i.e., a CD-ROM). Further, call control computer 14 may contain various combinations of machine readable storage devices through other I/O controllers, which are accessible by CPU 26, and which are capable of storing a combination of computer program instructions and data.

CPU 26 includes any processor of sufficient processing power to perform the HAD and data replication functionality found in call control computer 14. Examples of CPUs suitable to practice the invention includes the INTEL family of processors, such as the Pentium®, Pentium® Pro, and Pentium® II microprocessors.

Network interface 48 is used for communications between call control computer 14 and a communications network, such as LAN 44. Network interface 48 supports appropriate signaling and voltage levels, in accordance with techniques well known in the art.

I/O controllers 40 are used to control the flow of information between call control computer 14 and a number of devices or networks such as external memory 46 and network interface 48. System control module 28 includes human user system control, user interface, and operation. Bus adapter 30 is used for transferring data back and forth between CPU/memory bus 22 and I/O bus 38.

VRUs 16 and database computer 18 are similar to call control computer 14 described with reference to FIG. 3. VRUs 16 and database computer 18, however, replaces HAD module 32 with a Monitor Service (MON) module 50 (not shown in FIG. 3). MON 50 may also be implemented on other network devices internal or external to CPP 10.

HAD 32, MON 50 and dynamic data replication module 34 implements the main functionality for this embodiment of the invention. It is noted that HAD module 32 and dynamic data replication module 34 are shown in FIG. 3 as, and MON module 50 is described as, separate functional modules. It can be appreciated, however, that the functions performed by these modules can be further separated into more modules, combined together to form one module, or be distributed throughout the system, and still fall within the scope of the invention. Further, the functionality of these modules may be implemented in hardware, software, or a combination of hardware and software, using well-known signal processing techniques.

HAD 32 and MON 50 share responsibility for four central functions: (1) coordinating startup and shutdown of call control computers 14 and 20; (2) tracking and logging communication and activity states for call control computer 14 and 20; (3) detecting and alarming any hardware, software or other failures/problems; and (4) monitoring the operations of each other.

HAD 32 runs on both call control computers 14 and 20. Call control computers 14 and 20 have two primary modes: (1) an active mode; and (2) a standby mode. When a call control computer is in active mode, it is actively controlling call processing functions for CPP 10, and is referred to as an active call control computer. Similarly, HAD 32 running on the active call control computer is referred to as an active HAD (HAD-CurrActy). When a call control computer is in standby mode, it is kept ready to take over active control of the call processing functions for CPP 10 either on-demand or automatically with minimal impact on currently active calls. A call control computer in standby mode is referred to as a standby call control computer, and HAD 32 running on the standby call control computer is referred to as a standby HAD (HAD-Stand). At any time, only one of the two call control computers may be in active control of CPP 10.

HAD 32 provides the following functionality for call control computers 14 and 20:

1. Bringing up and shutting down the active call control computer's critical processes in a particular order during platform startup and shutdown.

2. Notifying the MONs running on the other network devices to bring up or shut down critical processes on the other network devices.

3. Performing on-demand or automatic switch-over of platform control between call control computers 14 and 20.

4. The standby HAD recognizes the need for, and initiates, automatic switch-over of platform control to the standby call control computer from a failed active call control computer with minimal loss of currently active calls.

5. Keeping track of the status of a call server's critical processes.

6. Keeping track of the status of other network devices' critical processes.

7. Recognizing which is the default active call control computer upon cold-start or re-start and automatically initializing the default active call control computer accordingly.

8. Responding to any MON's heartbeats or state queries from other network devices.

MON 50 runs on all network devices remote to call control computers 14 and 20, such as VRUs 16 and database computer 18. MON 50 provides the following functionality for these other network devices:

1. Recognizing which is the currently active call control computer by communication with the HAD-CurrActy.

2. Responding to either HAD's heartbeats, state queries, state change reports and state transition requests.

3. Keeping track of the status of the other network devices' critical processes.

4. Notifying the currently active HAD of any state changes or alarms.

5. Monitoring the communication status of the HAD-CurrActy and notifying the standby HAD of any problems.

To properly implement automatic switch over, the HAD 32 or MON 50 processes must detect and act upon system failures within a short period of time, e.g., 5 seconds of their occurrence. The type of failures that may be detected by HAD 32 or MON 50 include:

1. The failure of a critical process on a call server;

2. The loss of heart beat messages from a critical process; or

3. The loss of the active call server due to network or operating system failure.

Additional details for HAD 32 and MON 50 will be described later in this specification.

Dynamic data replication module 34 is responsible for replicating call data received at the active call control computer to the standby call control computer. Thus, if the active call control computer fails, the standby call control computer can take over call processing operations for CPP 10 while minimizing the number of calls dropped during the switch over process. Dynamic data replication module 34 is described in more detail with reference to FIG. 4.

Figure 4:
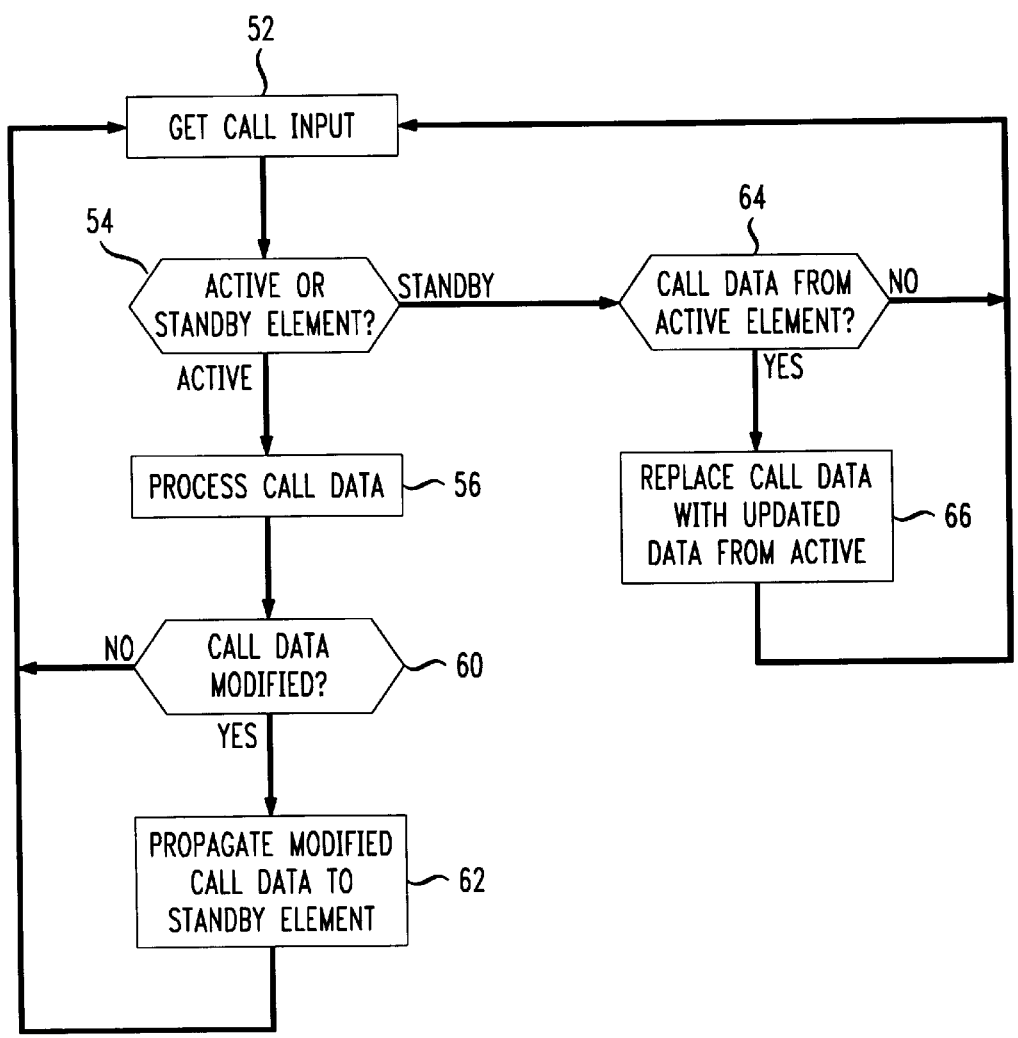
FIG. 4 illustrates a block flow diagram of steps performed by a dynamic data replication module in accordance with one embodiment of the invention.

FIG. 4 illustrates a block flow diagram of steps performed by a dynamic data replication module in accordance with one embodiment of the invention. As shown in FIG. 4, call data is received at step 52. At step 54, the system determines whether the active call control computer or standby call control computer is to receive the call data.

If the active call control computer is to receive the call data at step 54, the active call control computer processes the call data at step 56. Active call control computer accesses a call data record, and compares the received call data with the call data stored in the call data record at step 60. If the call data differs from the call data stored in the call data record at step 60, the call data is replicated and sent to the standby call control computer at step 62. If the call data is not different from the call data stored in the call data record at step 60, the system looks for the next set of call data at step 52.

If the standby call control computer is to receive the call data at step 54, the system determines whether the call data is from the active call control computer at step 64. If it is, the call data record for the standby call control computer is updated with the new call data at step 66. If the call data is not from the active call control computer at step 64, the system looks for the next set of call data at step 52.

Database computer 18 is a general purpose computer containing a relational database for use in call processing. As with the other network devices described with reference to CPP 10, database computer 18 includes a MON module 50 for monitoring call control computers 14 and 20. Database computer 18 also includes a static data replication module. The static data replication module receives static call data, and stores the static call data in a static call data profile in the relational database. Every time the static call data profile is updated, the static data replication module replicates the static call data stored in the static call data profile to call control computers 14 and 20.

CPP 10 periodically audits the call data records and the static call data profiles on a periodic basis. The data audits help ensure data synchronization between call control computers 14 and 20.

Figure 5A:
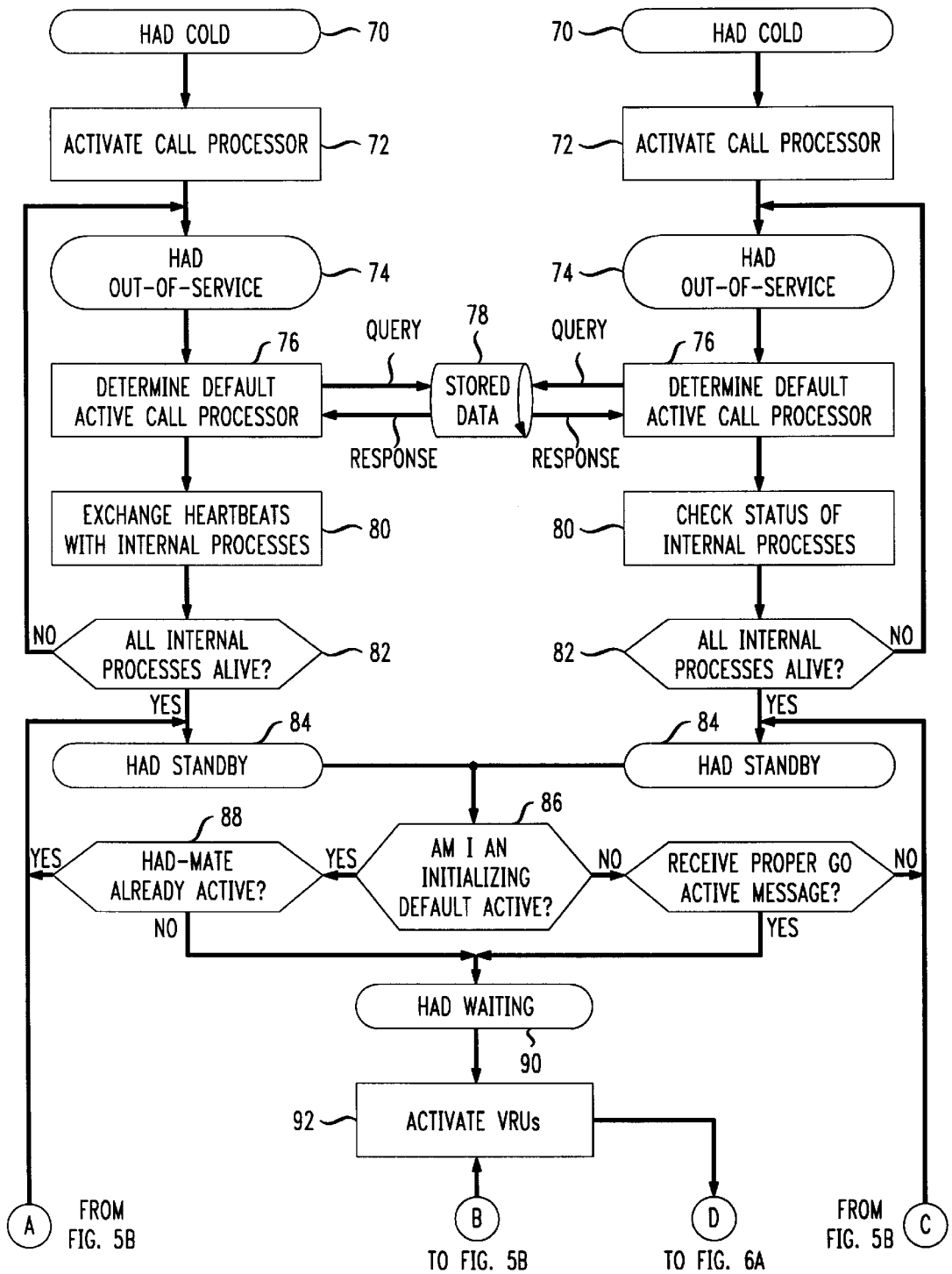
FIG. 5(a) illustrates a first block flow diagram of a High Availability Daemon (HAD) module in accordance with one embodiment of the invention.

FIG. 5(a) illustrates a first block flow diagram of a High Availability Daemon (HAD) module in accordance with one embodiment of the invention. CPP 10 has two call control computers, a first call control computer and a second call control computer. Each call control computer executes a HAD process, with each HAD process in communication with the other. For purposes of clarity, a HAD process running on the first call control computer will be referred to as "the first HAD process," and a HAD process running on the second call control computer will be referred to as "the second HAD process." Similarly, a HAD process running on the active call control computer will be referred to as "the active HAD process" and a HAD process running on the standby call control computer will be referred to as "the standby HAD process."

As shown in FIG. 5(a), each HAD process executes steps 70, 72, 74, 76, 78, 80, 82 and 84. At step 70, the HAD process is initiated. Upon start up, the HAD process activates the call control computer on which it is running at step 72. At step 74, the HAD is taken out of service. At Step 76, the HAD process determines whether the call control computer upon which it is running is the default active call control computer. In this embodiment of the invention, this determination is accomplished by querying stored data at step 78 and receiving a response to the query at step 76. Alternatively, other means could be implemented for choosing the default active call processor, such as through an alternating or random selection process, and still fall within the scope of the invention. At step 80, the HAD process exchanges heart beats with the internal processes running on the same call control computer that is running the HAD process. The HAD process determines whether all the internal processes are operating within normal performance parameters at step 82. If at step 82 all the internal processes are not operating according to normal performance parameters, then the HAD process is placed out of service again at step 71. If all internal processes are operating according to normal performance parameters at step 82, the HAD process is put in standby mode at step 84.

Thus at step 84, both HAD processes are placed in standby mode. The default active HAD process is initialized at step 86. The default active HAD processor then determines whether the other HAD process ("HAD mate") is already in active mode at step 88. If the HAD Mate is already active at step 88, the default active HAD process is placed on standby at step 84. If the HAD Mate is not already active at step 88, then the default active HAD is placed into a waiting mode at step 90. At step 92, the default active HAD process activates VRU 16, and sends a MON go active message 132 to MON 50.

Figure 5B:
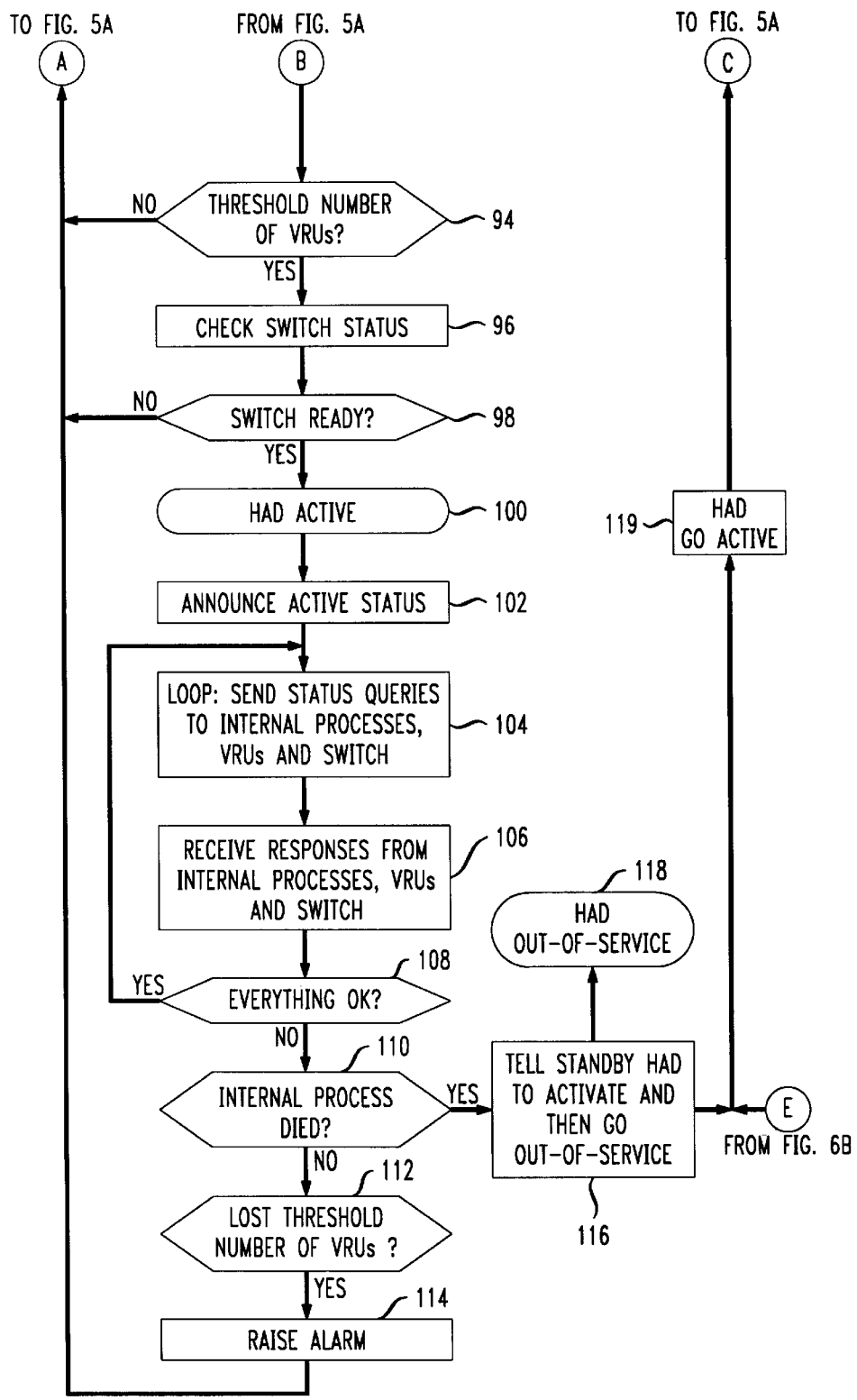
FIG. 5(b) illustrates a second block flow diagram of a HAD module in accordance with one embodiment of the invention.

FIG. 5(b) illustrates a second block flow diagram of a HAD module in accordance with one embodiment of the invention. The default active HAD process determines at step 94 whether the threshold number of VRU's have been activated. If the threshold number of VRU's have not been activated at step 94, then the default active HAD is placed in standby mode at step 84. If the threshold number of VRU's have been activated at step 94, the default active HAD process checks the switch status at step 96. The default active HAD process determines whether the switch is ready to perform switching functions at step 98. If the switch is not ready at step 98, the default active HAD process is put in standby mode at step 84. If the switch is ready to perform switching functions at step 98, then the default active HAD is placed in an active mode at step 100. Once the active HAD has been placed in active mode, the HAD process announces its active status to all the other network devices at step 102.

One function shared by the HAD processes and MON processes is to monitor the internal processes of the computer running the HAD or MON process, and also monitor network devices external to the computer running the HAD or MON process. At steps 104, 106 and 108, the active HAD process queries the internal processes of the active call control computer, as well as other network devices such as VRU 16 and Switching Matrix 12. At step 104, the active HAD process sends status queries to the internal processes, VRU 16 and Switching Matrix 12. The HAD process receives responses from the internal processes, VRU 16 and Switching Matrix 12 at step 106. At step 108, the HAD process determines whether the internal processes, VRU 16 and Switching Matrix 12 are functioning properly. If the internal processes, VRU 16 and Switching Matrix 12 are operating properly at step 108, then steps 104, 106 and 108 are repeated until the HAD process determines that one of the internal processes, VRU 16 or Switching Matrix 12 is not operating appropriately at step 108.

If a failure does occur in the internal processes, VRU 16 or Switching Matrix 12 at step 108, the HAD process determines whether it is the internal processes that have failed at step 110. If the internal processes have not failed at step 110, the HAD process determines whether the call processing platform 10 has lost a threshold number of VRU 16 at step 112. If a threshold number of VRUs are not present at step 112, then an alarm is raised at step 114 and the active HAD process is placed on standby at step 84.

If the active HAD process determines that an internal process has failed at step 110, the active HAD process notifies the standby HAD process to activate, and then orders the active call control computer to go out of service at step 116. The active HAD process is then placed out of service at step 118.

Figure 6A:
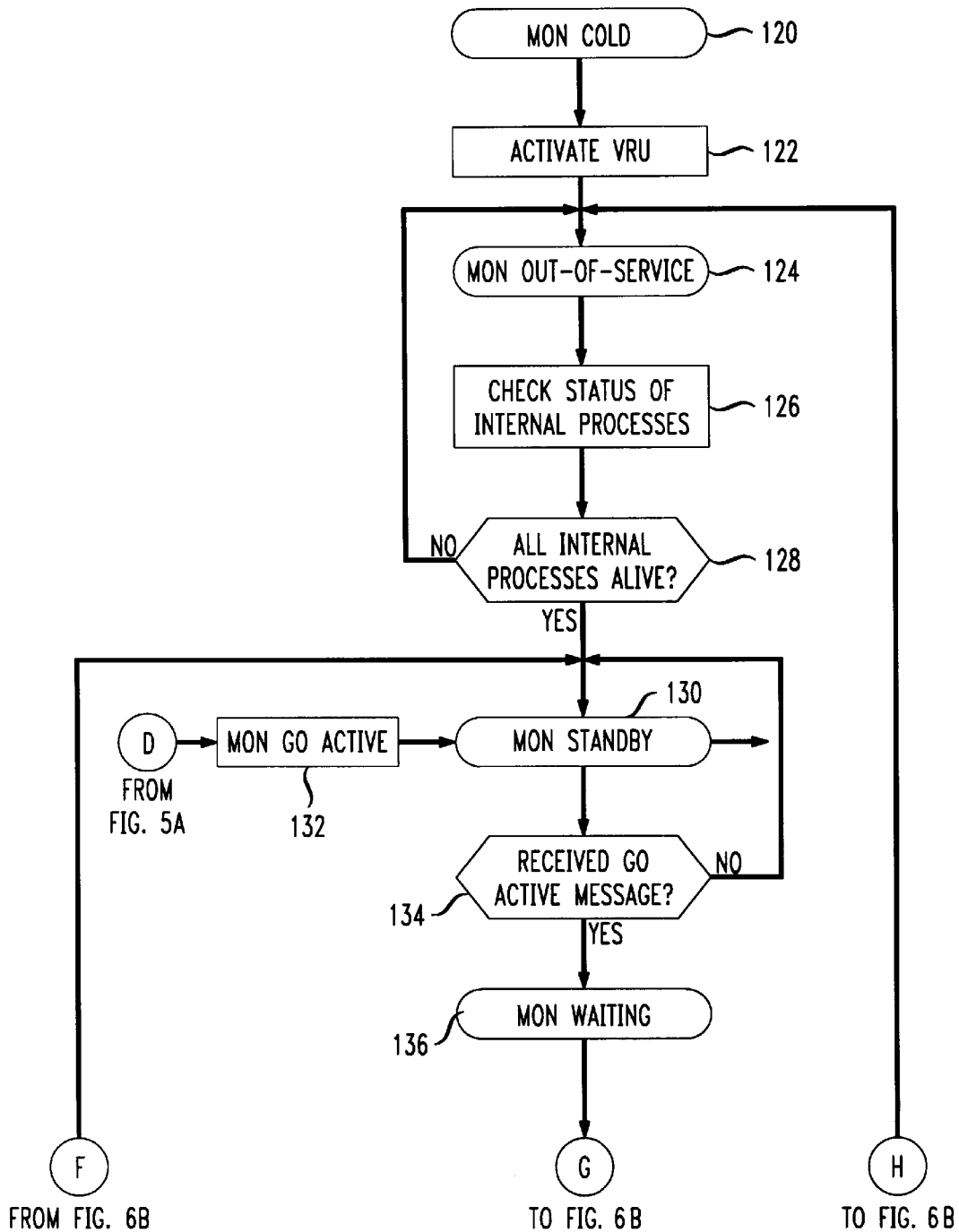
FIG. 6(a) illustrates a first block flow diagram of a Monitor Service (MON) module in accordance with one embodiment of the invention.

FIG. 6(a) illustrates a first block flow diagram of a Monitor Service (MON) module in accordance with one embodiment of the invention. FIG. 6(a) shows a Mon process which may be running on any of the network devices that are part of CPP 10. At step 120, a Mon process is started. At step 122, the Mon process activate, VRU 16. At step 124, the Mon process is placed out of service. The Mon process then checks the status of the internal processes of the device which is running the Mon process at step 126. The Mon process determines whether all the internal processes are running properly at step 128. If all the internal processes are not running properly at step 128, then the Mon process is placed out of service at step 124. If, however, all internal processes are running properly at step 128, then the Mon process is placed in a standby mode at step 130.

At step 134, the MON process determines whether it has received a MON go active message 132. If it has not received a MON go active message 132, then the MON process remains on standby mode at step 130. If a MON go active message 132 is received at step 130, the Mon process is placed in a waiting mode at step 136.

Figure 6B:
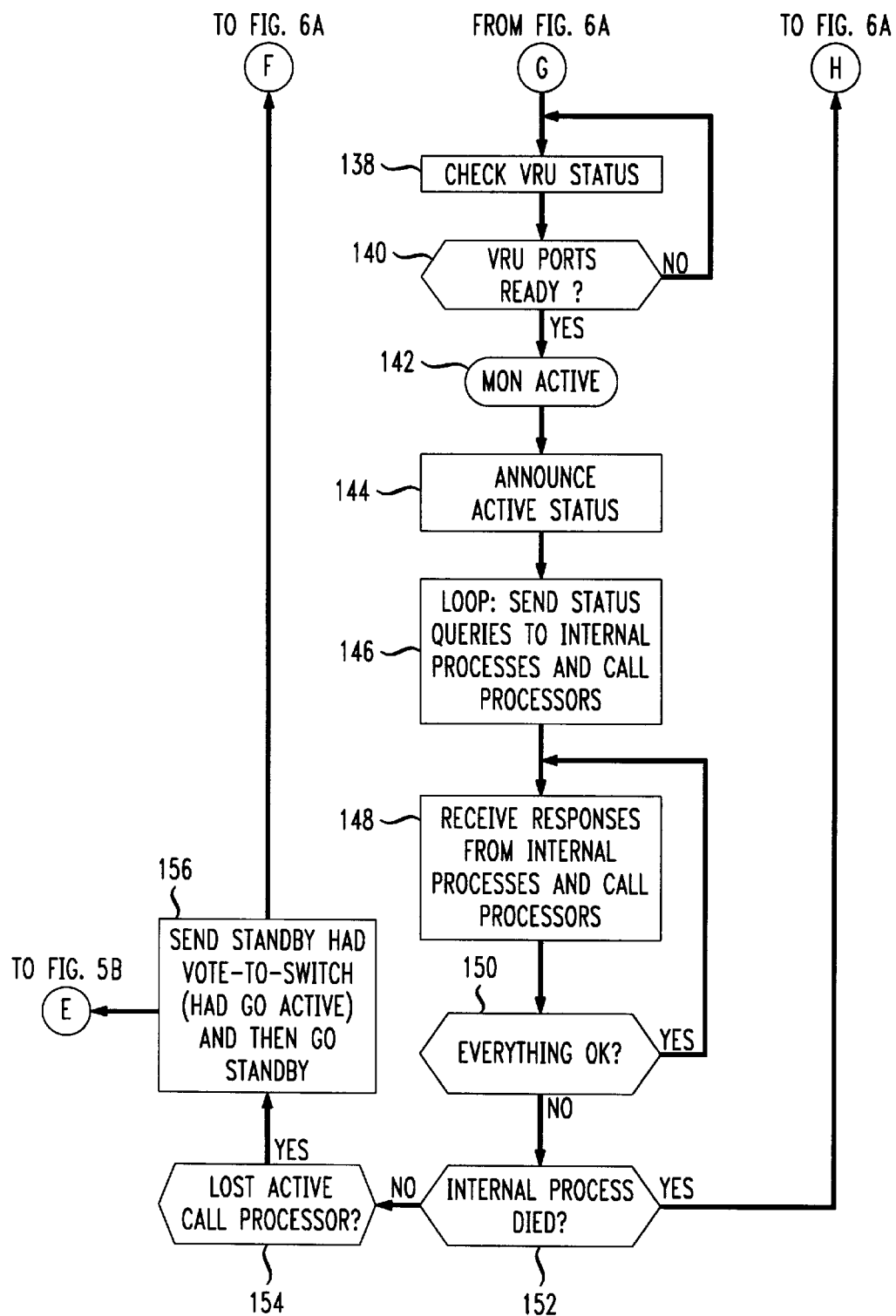
FIG. 6(b) illustrates a second block flow diagram of a MON module in accordance with one embodiment of the invention.

FIG. 6(b) illustrates a second block flow diagram of a MON module in accordance with one embodiment of the invention. At step 138, the Mon process checks the status of VRU 16. At step 140, the Mon process determines whether VRU 16 ports are ready. If the VRU ports are not ready at step 140, then steps 138 and 140 are repeated until the VRU ports are ready. If the VRU ports are ready at step 140, then the Mon process is placed in active mode at step 142. The active Mon process announces its active status to the other network devices at step 144.

Steps 146, 148 and 150 perform the monitoring process for the active Mon process. At step 146, the active Mon process sends status queries to the internal processes running on the device that is running the active Mon process, and also checks the status of the active and standby call control computers. Responses from the internal processes and the active and standby call control computers are received at step 148. The active Mon process determines at step 150 whether the internal processes and the active and standby call control computers are operating within normal performance parameters. If the internal processes and active and standby call control computers are working within normal parameters at step 150, steps 148 and 150 are repeated until the Mon process determines that the internal processes, the active call control computer or the standby call control computer has failed at step 150. In the event of a failure at step 150, the Mon process determines whether an internal process has failed at step 152. If an internal process has failed at step 152, then the Mon process is placed out of service at step 124. If an internal process has not failed at step 152, then the active Mon process determines whether the active call processor has failed at step 154. If the active call processor has failed at step 154, the active Mon process sends the standby HAD process a vote-to-switch (HAD Go Active message 119) at step 156, and then goes into a standby mode at step 130.

Referring again to FIG. 5(b), a HAD Go Active message 119 is sent to the standby HAD process at step 84. At step 86, the standby HAD process determines whether it is being initialized as the default active HAD process. Since the standby HAD process is not being initialized as the default active HAD process at step 86, the standby HAD process determines whether it has received a proper HAD go active message 119 at step 160. If the standby HAD process has not received a proper HAD go active message 119 at step 160, the standby HAD process remains in standby mode at step 84. If the standby HAD process receives a proper HAD go active message 119 at step 160, the standby HAD process performs steps 90 to 118 as the newly active HAD process.

The operation of CPP 10 can be better understood through the following example. Assume that a passenger on an airplane desires to make a telephone call. The passenger takes the handset portion of an air terminal off hook and presses an ON button. When the handset is turned ON, the air terminal seizes a radio channel to a ground station. The ground station performs a network connection to CPP 10. A message is sent to the active call control computer of CPP 10 that Switching Matrix 12 has detected a trunk seizure. The active call control computer then begins a new call record, and replicates the new call record to the standby call control computer.

Switching Matrix 12 then notifies VRU 16 of an incoming call request. VRU 16 performs answer supervision and requests identification information from the ground station. The ground station sends back ground station/air terminal (GS/AT) identifiers to Switching Matrix 12, which passes the GS/AT identifiers to VRU 16. VRU 16 sends the GS/AT identifiers to the active call control computer. The active call control computer updates its call data record, and replicates the GS/AT identifiers to the standby call control computer so that it may update its call data record. The active call control computer then accesses a static call data profile on database computer 18 to validate the GS/AT identifiers. If the GS/AT identifiers are valid, the active call control computer updates its call data record and replicates the validated GS/AT identifiers to the standby call control computer so that it may update its call data record.

The active call control computer then sends a message to VRU 16 that it is clear to collect call information. VRU 16 passes the same message to Switching Matrix 12. Switching Matrix 12 sends an acknowledgment to the ground station that the GS/AT identifiers are valid. The air terminal cuts a voice path to ground station, which in turn cuts a voice path to Switching Matrix 12. Switching Matrix 12 then cuts a voice path to VRU 16. VRU 16 plays a dial tone that is sent to the air terminal. Once the passenger on the airplane receives the dial tone, the passenger is prompted to swipe his or her credit card to pay for the telephone call. The credit card information is received by VRU 16, which passes it along to the active call control computer to update its call data record. The active call control computer then replicates the credit card information to the standby call control computer so that the standby call control computer may update its call data record. The active processor then checks the static call data profile to determine whether the credit card number is a valid number. If the credit card number is valid, the active processor sends a message to VRU 16 that it is clear to collect a destination number from the passenger. The active call control computer also replicates the validation message to the standby call control computer. Once VRU 16 receives clearance to collect a destination number, VRU 16 plays the dial tone again for the passenger using the air terminal. The passenger enters a destination telephone number to complete a call connection. The destination telephone number is sent from the air terminal to VRU 16, which in turn passes it to the active call control computer so that it may update its call record. The active call control computer then replicates the destination telephone number to the standby call control computer. As with the GS/AT identifiers and credit card information, the active call control computer validates the destination telephone number by accessing the static call data profile stored by Database Computer 18. If the destination phone number is a valid destination phone number, the active call control computer sends a message to VRU 16 that it is okay to brand the call. The active call control computer also updates its own call record and replicates the validation of the destination telephone number to the standby call control computer so that it may update its own call data record. VRU 16 sends a message to the passenger indicating that the call connection has been made by sending a message such as "Thank you for using AT&T."

At this point, VRU 16 sends a message to the active call control computer that the call branding is completed. The active call control computer sends a message to Switching Matrix 12 to set up a communication link to the called party. Switching Matrix 12 initiates a communication link and waits for an answer from the called party. If switching matrix 12 receives an answer, it sends a message to the active call control computer to begin billing. The active call control computer then updates its call data records, and replicates the call data to the standby call control computer.

Once a call connection is established, the passenger may begin a conversation with the called party. Assume that sometime during the conversation, HAD 32 running on the Standby Call Computer, or Mon 50 running on VRU 16, Switching Matrix 12 or Database Computer 18, detects a hardware or software failure on the active call control computer. The HAD 32 or Mon 50 sends a Vote-To-Switch message to the standby HAD. If the standby HAD receives two such messages within a predetermined period of time, the standby HAD sends a message to the active HAD telling the active HAD to enter standby mode. The standby HAD then places the standby call control computer in active mode. The standby call control computer then retrieves the call data for this particular call from its call data record. The newly activated call control computer then sends a message to Switching Matrix 12 to send it all future data for this particular call. Since the standby call control computer has an updated call data record, the passenger and called party can continue their conversation without any interruptions.

Had Module 32

HAD module 32 (hereinafter referred to simply as "HAD") runs on a call control computer as a message-driven state transition engine designed to coordinate the call processing states of a Resource Manager (REM) module running on the active call control computer with a Remote Access Dip (RAD) module running on VRUs 16. HAD talks to a MON-CV module running on VRUs 16 to exchange information about platform startup/shutdown. MON-CV in turn relays messages to RAD.

The HAD message types listed here are named generically for simplicity when used in describing the HAD activities and state transitions that follow. HAD receives the following messages:

ImAlive—from MONs, HAD-Mate and critical processes when they have initialized; from critical processes as a heartbeat answer ImDead—from MONs, Had-Mate and critical processes when they are going down gracefully MonState—from the MONs as a heartbeat answer and report of current activity level RemState—from the critical process REM to report its current call processing level HadState—from HAD-Mate as a heartbeat answer and report of current activity level StateQuery—from MONs and HAD-Mate to request a heartbeat response in the form of a report on current level of activity GoActive—from UI for on-demand activation; from HAD during a switch-over GoStandby—from UI for on-demand de-activation; from HAD during a switch-over VoteToSwitch—from a MON to HAD-Stand when MON has detected missed responses heartbeats by HAD-CurrActy ImController—from its HAD-Mate when HAD-Mate going active HAD sends the following messages:

ImAlive—to MONs, HAD-Mate and critical processes when HAD has initialized

ImDead—to MONs, HAD-Mate and critical processes when HAD is going down gracefully AliveQuery—to critical processes to request a heartbeat response in the form of an ImAlive report StateQuery—to HAD-Mate and MONs to request a heartbeat response in the form of a report on current level of activity HadState—to HAD-Mate and MONs as a heartbeat answer and report of current activity level GoActive—to HAD-Stand from HAD-CurrActy to bring the standby HAD up to fully active call processing level when HAD-CurrActy has lost a critical process; to MON-Cvs to bring them to fully active state; to REM to bring it to fully active state ImController—to its HAD-Mate and MONs when going active Upon initialization, HAD goes through a setup process that includes reading its parameter files. One of the parameters is the default active All Server designation, DEF_ACTIVE_CS. If HAD sees that its call control computer is the default active call control computer, then HAD records itself as being the default active HAD, or HAD-DefActy. It knows then to try to go active automatically without receiving a manual GoActive command from the User Interface (UI). The rules are:

If HAD-DefActy sees that its HAD-Mate is not active (out-of-service or on warm standby), then it will go fully active.

If HAD-DefActy sees that its HAD-Mate is going active or already active, then it will only go to warm standby state.

If a HAD sees that it is NOT the default active, then it also knows to only go to the warm standby state. The HAD that is not default active may be brought active by explicit command from the UI during manual switch-over or by a GoActive command from its HAD-Mate or through the automatic VoteToSwitch switch over scenario.

If either HAD process dies and re-spawns, it goes through the same initialization as it would during a cold start. The re-spawned HAD reads the DEF_ACTIVE_CS parameter and proceeds as above.

To initiate tracking of critical processes by HAD, all critical processes on the call control computer send an ImAlive report on start-up to HAD. HAD then creates a process record that contains updatable information about the process' communication status or, if appropriate, its process state. When the other monitors, MON-Op, MON-CV and HAD-Mate wake up, they also report ImAlive to HAD.

HAD uses an internal alarm routine to regularly heartbeat critical call control computer processes. HAD sends AliveQueries as heartbeats to all its critical processes every PROC_HB_INTERVAL number of seconds. All recipients of HAD's AliveQuery should respond with an ImAlive. Upon receipt of an ImAlive response from a critical process, HAD updates that process's heartbeat record. HAD keeps track of unanswered AliveQueries. If a process fails to respond to PROC_HB_MISSES number of HAD's AliveQueries, HAD may raise alarms or undergo a state transition. The PROC_HB_INTERVAL and PROC—HB_MISSES parameters are tuneable.

The UI maintains HAD's list of critical processes in a parameter file. HAD reads these parameters on startup or when UI sends it a RereadParms command.

HAD uses an internal alarm routine to regularly heartbeat the remote MON server. HAD sends StateQueries as heartbeats to the MONs, which include MON-CV and MON-Op. However, only the MON-Cv's current level of activity is important for HAD's monitoring of platform health and call processing ability. (MON-Op operates independently of the rest of the platform.) HAD sends these heartbeats every MON_HB_INTERVAL number of seconds. MONs should answer StateQueries with a MonState report. Upon receipt of a MonState report, HAD updates the MON's heartbeat and state record. HAD keeps track of unanswered StateQueries. If a MON fails to respond to MON_HB_MISSES number of HAD's StateQueries, HAD raises an alarm but does not undergo any state transition itself. Both MON_HB_INTERVAL and $MON\_{HB}\_MISSES$ are tuneable parameters.

a MON's state may be:

MON_OOS ("OOS" stands for "Out-of-Service")
MON_STANDBY
MON_WAIT_RAD_ACTIVE
MON_ACTIVE
MON_WAIT_RAD_OOS
$MON\_MAINT_{STANDBY}$ HAD, whether ACTIVE or STANDBY, tracks its HAD-Mate with StateQuery heartbeats. The HAD-Mate should respond with a HadState report. Upon receipt of a HadState report, HAD updates HAD-Mate's heartbeat and state record. HAD keeps track of unanswered StateQueries. If the HAD-CurrActy fails to respond to HAD_HB_MISSES number of HAD-Stand's StateQueries, then HAD-Stand begins to look for confirmation of HAD-CurrActy communication problems in the form of a VoteToSwitch notification from any MON that has also detected communication failure with HAD-CurrActy. If HAD-Stand gets this confirming VoteToSwitch from MON within SWITCH_INTERVAL seconds of the time HAD-Stand first detected missed heartbeats, it initiates automatic quick switch-over of the platform and brings its call control computer to full activation. If HAD-Stand gets a VoteToSwitch from a MON before HAD-Stand itself had detected missed HAD-CurrActy heartbeats, then HAD-Stand starts counting the SWITCH_INTERVAL and waits for another VoteToSwitch from another MON before beginning automatic quick switch-over. If HAD-Stand switches-over and becomes the currently active HAD, it sends the other monitors an ImController announcement so that call flow may be re-directed to the new active call control computer. The parameters SWITCH_INTERVAL and HAD_HB_MISSES are tuneable. Please note that automatic quick switch-over occurs without any reference to which call control computer is designated the default active.

HAD's state may be:
HAD_OOS
HAD_STANDBY
HAD_WAIT_MONS
HAD_WAIT_REM
HAD_ACTIVE

A tracked critical process's or MON's or HAD-Mate's heartbeat status may be:

ALIVE—if process c continues to answer AliveQueries from HAD.

MISSES_HTBT—if process has failed to respond to one or more successive AliveQueries up to PROC_HB_MISSES number.

NOT_RESPONDING—if process has failed to respond to PROC_HB_MISSES successive AliveQueries, but the process is not found to be dead using kill(O).

DEAD—if a non-responding process is found to be dead using kill(O). Also, an ImDead from a critical process will cause an immediate transition to this heartbeat status, or lack thereof.

HAD relies on the following variables:

DEF_ACTIVE_CS—This is the machine name of the designated default active call control computer. It may be changed at any time. It is used by a HAD when initializing or when trying to resolve conflicting activity levels with its HAD-Mate.

PROC_HB_INTERVAL—This is the interval in seconds between AliveQuery heartbeats sent by HAD to its critical processes and StateQuery hearts to its HAD-MATE. The default is 1 second.

PROC_HB_MISSES—This is the number of successively missed responses to AliveQueries that HAD allows a critical process before declaring it NOT_RESPONDING. The default is 2.

REM_INIT_TIMER—This is the number of successively missed responses to AliveQueries that HAD-CurrActy allows REM when HAD-CurrActy has just transitioned into HAD-Wait_REM state and send REM a GoActive command.

MON_HB_INTERVAL—This is the interval in seconds between StateQuery heartbeats sent by HAD to MONs. The default is 10 seconds.

MON_HB_MISSES—This is the number of successively missed responses to StateQueries that HAD allows a MON before declaring it NOT_RESPONDING. The default is 2.

SWITCH_INTERVAL—This is the interval in seconds after the HAD-Stand has detected or received notification of HAD-CurrActy's non-responsiveness from a MON. HAD-Stand must receive a confirmation of the HAD-CurrActy problem from another MON in order to begin an automatic quick switch-over. The default is 5 seconds.

The following comprises a description of HAD states and transitions.

HAD_OOS:
When HAD initializes its starts in the out-of-service state, HAD-OOS. When all its call control computer Critical processes have initialized and sent ImAlive declarations, HAD transitions to the next standby state.

HAD_STANDBY:
In state HAD_STANDBY, all critical call control computer processes are responding to AliveQueries and HAD is talking to the remote MONs on all the CRIS units and to its HAD-Mate. HAD is considered to be on warm standby. If HAD recognizes itself to be the default active HAD, it transitions to the next waiting state if its HAD-Mate is not currently active. If HAD is told to GoActive by UI or its HAD-Mate, it transitions to the next waiting state regardless of who is the default active HAD. And if HAD receives a VoteToSwitch notification and confirmation, it transitions to the next waiting state to begin an automatic quick switch-over. If HAD is able to GoActive, it notifies everyone with an ImController announcement.

HAD_WAIT_MONS:
In this state, HAD is considered to be "going active". If HAD has arrived at this state during an automatic initialization or during a quick switch-over, then HAD looks for messages from all MON-Cvs that acknowledge HAD as active and at least one MON-CV as in standby state. When these have been received, HAD transitions to the next state and sends REM a RemGoActive command. If HAD has arrived at the HAD_WAIT_MONS state during an on-demand graceful switch-over, HAD tells the MON-Cvs to step down to standby mode. Then HAD looks for messages from all MON-Cvs that acknowledge HAD as active and at least one MON-CV as in standby state. When these have been received, HAD transitions to the next state and sends a RemGoActivef command to its critical process REM.

HAD_WAIT_REM:
In this state, HAD is still active. HAD is waiting for REM to answer the RemGoActive command with a RemGoneActive report. When HAD gets this report, it transitions to the fully active HAD_ACTIVE state and sends the MON-Cvs a GoActive command. (The MON-Cvs may already be in active state if a quick switch-over is under way.)

HAD_ACTIVE
In this state, the RAD is processing calls and interacting with REM on the call control computer. HAD is sending periodic AliveQuery and StateQuery heartbeats, updating communication and state records and keeping track of missed heartbeat responses. If HAD sees that a critical process is not responding to its AliveQueries, or if a critical process sends an ImDead report, HAD will transition down to state HAD_OOS and send a Go-Active command to its HAD-Mate to takeover. It brings down call processing on its call control computer by sending REM a GoStandby command.

The following Tables 1 through 5 provide detailed information regarding the functions of HAD in response to certain conditions.

TABLE 1

HAD STATE: HAD_OOS

| Stimulus | New State | Action |
|---|---|---|
| from REM or critical processes: | | |
| ImAlive from a critical process making all critical processes alive or periodic check of received AliveQuery responses shows all critical processes alive 1-1 | HAD-STANDBY | Send Mate HadGoneStandby Send Mon-Op HadGoneStandby |
| ImDead from a critical process or periodic check of missed AliveQuery responses exceeds threshold for critical process | * | Had already HAD_OOS. |
| RemGoneActive | * | Update Rem state. Alarm "Rem went Active unexpectedly". Tell RemGoStandby. |
| RemGoneStandby | * | Update Rem state. |
| from HAD-Mate or UI: | | |
| GoActive | * | Alarm "Had cannot go ACTIVE from OOS |
| GoStandby | * | Alarm "Had cannot go STANDBY from OOS |
| from MON: | | |
| Monstate | * | Update Mon's state. |
| ImAlive | * | Update Mon's status, |
| ImDead from Mon-CV shows all Mon-Cvs dead or periodic check of missed StateQuery responses shows all Mon-Cvs dead | * | Update Mon's state. Alarm "All CRIS are dead". |
| VoteToSwitch and confirmation within Switch_Interval | * | Alarm "Had-Mate dying. This Had OOS and cannot take over!". |
| from HAD-MATE: | | |
| ImController | * | Ignore. |
| HadState | * | Update Had's state. |
| ImDead | * | Update Had's state. Alarm "Had-Mate dying. This Had OOS and cannot take over!". |

TABLE 2

HAD STATE: HAD_STANDBY

| Stimulus | New State | Action |
|---|---|---|
| from REM or critical processes: | | |
| ImAlive from a critical process making all critical processes alive or periodic check of received AliveQuery responses shows all critical processes alive | * | Had already HAD_STANDBY. |
| ImDead from a critical process or periodic check of missed AliveQuery response exceeds threshold for critical process | HAD_OOS | Send Had-Mate HadGoneOos. Send Mons HadGoneOos. Tell Had-Mate GoActive. Alarm "This Had lost critical process. Going OOS Had-Mate taking over". |
| RemGoneActive | * | Update Rem state. Alarm "Rem went Active unexpectedly". Tell RemGoStandby. |
| RemGoneStandby | * | Update Rem status. |
| from HAD-Mate or UI: | | |
| GoActive (quick) | HAD_WAIT_MONS | Log "This Had STANDBY and beginning quick switch-over!" Record Had-CurrActy = me. Tell Had-Mate GoStandby. Tell Mon ImController. Tell Had-Mate HadGone WaitMons. Send Mons MonGoneWaitMons. |
| GoActive (graceful) | HAD_WAIT_MONS | Log "This Had STANDBY and beginning Graceful switch-over!" Record Had-CurrActy = me. Tell Had-Mate GoStandby. Tell Mon-Cvs GoStandby. Tell Mon ImController. (*) Tell Had-Mate ImController. Send Had-Mate HadGoneWait Mons. Send Mon-Op MonGoneWaitMons. |
| GoStandby | * | Ignore. Had already HAD_STANDBY. |
| from MON: | | |
| MonState | * | Update Mon's state |
| ImAlive | * | Update Mon's status |
| ImDead from Mon-CV making all Mon-Cvs dead or periodic check of missed StateQuery responses exceeds threshold for Mon-Cvs | * | Alarm "All CRIS are dead". |
| VoteToSwitch and confirmation within Switch_Interval | HAD_WAIT_MONS | Alarm "Had-Mate dying. This Had STANDBY and beginning quick switch-over!" Record Had-CurrActy = me. Tell Had-Mate GoStandby. Tell Had-Mate ImController Tell Mon ImController. |

TABLE 2-continued

HAD STATE: HAD_STANDBY

| Stimulus | New State | Action |
|---|---|---|
| | | Send Had-Mate HadGoneWaitMons Send Mons HadGoneWaitMons. |
| initialization determination only done in HAD_STANDBY state: | | |
| Im Had-DefActy and Had-Mate is NOT currently Active, so I will GoActive automatically. | HAD_WAIT_MONS | Log "This Had Standby and beginning automatic initialization!" Record Had-DefActy = me. Record Had-CurrActy = me. Tell Had-Mate GoStandby. Tell Mon-Cvs GoStandby. Tell Had-Mate ImController. Tell Mon ImController. Send Had-Mate HadGoneWaitMonsStandby. Send Mons HadGoneWaitMonsStandby. |
| I AM Had-DefActy but Had-Mate is currently Active, so I will stay Standby. | * | Record Had-DefActy = me. Record Had-CurrActy = mate |
| I am NOT Had-DefActy. from HAD-Mate: | * | Record Had-DefActy = mate. |
| ImController from Had-Mate but I am Had-DefActy Looks like Had-Mate go there first! | * | Record Had-DefActy = me. Record Had-CurrActy = mate. |
| ImController from Had-Mate and I am not Had-DefActy Looks like Had-Mate doing an automatic startup. | * | Record Had-DefActy mate. Record Had-CurrActy = mate. |
| HadState | * | Update Had's state. |
| ImDead | HAD_WAIT MONS | Alarm "Had-Mate dying. This Had STANDBY and beginning quick switch-over!" Record Had-CurrActy = me. Tell Had-Mate GoStandby. Tell Had-Mate ImController. Tell Mon ImController. Send Had-Mate HadGoneWaitMons. Send Mons HadGoneWaitMons. |

TABLE 3

HAD STATE: HAD_WAIT_MONS

| Stimulus | New State | Action |
|---|---|---|
| from REM or critical processes: | | |
| ImDead from a critical process or periodic check of missed Alive Query responses exceeds threshold | HAD_OOS | Send Had-Mate HadGoneOos. Send Mons HadGoneOos. Tell Had-Mate GoActive. Tell RemGoStandby Alarm "This Had lost critical process. Going OOS. Had-Mate taking over". |
| for critical process RemGoneActive | * | Update Rem state |
| RemGoneStandby from HAD-Mate or UI: | * | Update Rem state |
| GoActive | * | Ignore. Had already going ACTIVE. |
| GoStandby | HAD_STANDBY | Send Had-Mate HadGoneStandby. Send Mons HadGone Standby. Tell RemGoStandby. |
| from MON: | | |
| MonState message from a Mon-CV confirms all Mon-Cvs know I am Had-CurrActy and at least one Mon-CV standby or periodic check of Mon-CV records confirms same | * HAD_WAIT_REM | Update Mon's state Send Had-Mate HadGoneWaitRem Send Mon-Op HadGoneWait Rem Tell RemGoActive. |
| ImAlive | * | Update Mon's status |
| ImDead from Mon-CV making all Mon-Cvs dead or periodic check of Mon-CV records shows all Mon-CVs dead | * | Alarm "All CRIS are dead". |
| VoteToSwitch and confirmation within Switch_Interval from HAD-Mate | * | Ignore. Had already going ACTIVE. |
| ImController from Had-Mate but I am Had-DefActy and also going active! This shouldn't happen, but if it does I will tell my confused Had-Mate who's boss | * | CONFLICT! Had-DefActy wins and reasserts control Tell Had-Mate GoStandby Tell Had-Mate ImController. Tell Mon ImController. Alarm "Possible Had conflict over who is active. Stay tuned"! |
| ImController form Had-Mate when I am going active but I am NOT Had-DefActy Now I'm the one who is confused! I must step down. | HAD_STANDBY | CONFLICT Had-DefActy wins. I am NOT Had-DefActy, so I give up! Had-Mate will probably be sending me a GoStandby anyway. This is the previous conflict reversed. Tell RemGoStandby Alarm "Possible Had conflict over who is active. Stay tuned"! |
| HadGoneOos or HadGoneStandby | * | Update Had's state |
| HadGoneWaitMons Standby or HadGoneWaitRemActive or HadGoneActive | * | Alarm "Conflicting Had states. This Had WAIT_MONS. Had-Mate is Active." |
| ImDead | * | Alarm "Had-Mate dying This Had already WAIT-MONS-STANDBY and going ACTIVE!" |

TABLE 4

HAD STATE: HAD_WAIT_REM

| Stimulus | New State | Action |
|---|---|---|
| from REM or critical processes; | | |
| ImDead from a critical process or periodic check of missed Alive Query responses exceeds threshold for critical process | HAD_OOS | Send Had-Mate HadGoneOos. Send Mons HadGoneOos. Tell Had-Mate GoActive. Tell RemGoStandby. Alarm "This Had lost critical process. Going OOS. Had-Mate Had taking-over". |
| RemGoneActive | HAD_ACTIVE | Update Rem state Tell MonGoActive Send Mate HadGoneActive Send Mons HadGoneActive |
| RemGoneStandby | * | Update Rem state Alarm "Rem goneSTANDBYunexpectedly" |
| from HAD-Mate or UI: | | |
| GoActive | * | Ignore. Had already going ACTIVE. |
| GoStandby | HAD_STANDBY | Send Had-Mate HadGoneStandby. Send Mons HadGoneStandby. Tell RemGoStandby. |
| from MON: | | |
| MonState | * | Update Mon's state |
| ImAlive | * | Update Mon's status |
| ImDead from Mon-CV making all Mon-Cvs dead or periodic check of missed StateQuery responses shows all Mon-Cvs dead | * | Update Mon's state Alarm "All CRIS are dead". |
| VoteToSwitch and confirming vote within Switch_Interval from HAD-Mate | * | Ignore. Had already gone ACTIVE |
| ImController from Had-Mate but I am Had-DefActy and also going active! This shouldn't happen, but if it does I will tell my confused Had-Mate who's boss. | * | CONFLICT! Had-DefActy wins and reasserts control. Tell Had-Mate GoStandby Tell Had-Mate ImController. Tell Mon ImController. Alarm "Possible Head conflict over who is active. Stay tuned!" |
| ImController from Had-Mate when I am going active but I am NOT Had-DefActy Now I'm the one who is confused! I must step down. | HAD_STANDBY | CONFLICT! Had-DefActy wins. I am NOT Had-DefActy, so I give up! Had-Mate will probably be sending me a GoStandby anyway. This is the previous conflict reversed. Tell RemGoStandby Alarm "Possible Had conflict over who is active. Stay tuned!" |
| HadGoneOos or HadGoneStandby | * | Update Had-mate's state. |
| HadGoneWaitMonsStandby or HadGoneWaitRemActive ort HadGoneActive | * | Update Had-Mate's state Alarm "Conflicting Had states. This Had is WAIT_REM. Had-Mate is ACTIVE." |
| ImDead | * | Alarm "Had-Mate dying. This Had already WAIT_REM and going ACTIVE!" |

TABLE 5

HAD STATE: HAD_ACTIVE

| Stimulus | New State | Action |
|---|---|---|
| from REM or critical processes: | | |
| ImDead from a critical process or periodic check of missed AliveQuery responses exceeds threshold for critical process | HAD_OOS | Send Had-Mate HadGoneOos. Send Mons HadGoneOos. Tell Had-Mate GoActive. Tell RemGoStandby. Alarm "This Had lost critical process. Going OOS. Had-Mate taking over". |
| RemGoneActive | * | Update Rem state |
| RemGoneStandby | * | Update Rem state Alarm "Rem gone STANDBY unexpectedly". Tell RemGoActive. |
| from HAD-Mate or UI: | | |
| GoActive | * | Ignore. Had already ACTIVE. |
| GoStandby | HAD_STANDBY | Send Had-Mate HadGoneStandby. Send Mon-Op HadGOneStandby. Tell RemGoStandby. |
| from MON: | | |
| MonState | * | Update Mon's state |
| ImAlive | * | Update Mon's state |
| ImDead from Mon-CV making all Mon-Cvs dead or periodic check of missed StateQuery responses shows all Mon-Cvs dead | * | Update Mon's state Alarm "All CRIS are dead". |
| VoteToSwitch and confirming vote with Switch_Interval from HAD-Mate | * | Ignore. Had already ACTIVE. |
| ImController from Had-Mate and I am already fully active. This shouldn't be happening. But since ImController message is sent by Hads at the BEGINNING of going active, I think I win here. | * | Tell Had-Mate GoStandby Tell Had-Mate ImController. Tell Mon ImController. Alarm "Possible Had conflict over who is active. Stay tuned!" |
| HadGoneOos or HadGone Standby | * | Update Had's state |
| HadGoneWaitMonsStand by or | * | Update Had's state Alarm "Conflicting Had |

TABLE 5-continued

HAD STATE: HAD_ACTIVE

| Stimulus | New State | Action |
|---|---|---|
| HadGoneWaitRemActive or HadGoneActive | | states. Had-Mate is ACTIVE." |
| ImDead | * | Alarm "Had-Mate dying. This Had already ACTIVE." |

Mon Module 50

Mon module 50 may be optimized to run on different network devices, e.g., a VRU or database computer. This detailed description will provide an outline of two types of MON modules, the first designed for a VRU (MON-CV) and the second designed for a ground to air server (GTAS) (MON-OP) used in one embodiment of the invention.

MON-CV

MON-CV runs on VRUs 16 as a message driven state transition engine designed to monitor and coordinate the call processing states of the RAD module running on VRUs 16 with the call processing states of the REM module running on the active call control computer. Mon-CV talks to the HAD-CurrActy server to receive platform startup/shutdown commands and other updates from it. MON-CV also keeps an eye on the HAD-CurrActy's communication status. If MON-CV detects any problems talking to HAD-CurrActy, it will immediately notify the standby HAD to be alert for a possible switch-over.

The MON-CV message types listed here are named generically for simplicity when used in describing the MON-CV activities and state transitions that follow. MON-CV receives the following messages:

ImAlive—from both HADS and from its critical process RAD when they have initialized and from RAD regularly as a heartbeat answer to confirm viability.

ImDead—from both HADs or RAD when they are going down gracefully.

StateQuery—from HADs to request a heartbeat response in the form of a state report.

HadQuery—from HADs as a heartbeat answer in the form of a state report.

RadGoneOos—from RAD to report its current call processing level as out-of-service.

RadGoneActive—from RAD to report its current call processing level as active.

RadGoneMoos—from RAD to report itself in a maintenance state.

GoActive—from HAD-CurrActy for normal activation, from UI for manual activation.

GoStandby—from UI or HAD for de-activation.

ImController—from the HAD going active during initialization or switch-over.

MON-CV sends the following messages;

AliveQuery—to RAD to request a heartbeat response indicating viability.

StateQuery—to HADs to request a heartbeat response in the form of a state report.

MonState—to HADs as a heartbeat answer and report of current activity level.

GoOos—to RAD to step it down from active call processing to out-of-service.

GoActive—to RAD to bring it up to fully active call processing level.

VoteToSwitch—to HAD-Stand when MON-CV has detected a communication problem with the currently active HAD.

MON-CV uses an internal alarm routine to regularly send an Alive Query heartbeat every PROC_HB_INTERVAL number of seconds. RAD should respond with an ImAlive report. Upon receipt of an ImAlive from RAD, MON-CV updates the communication status of RAD. If RAD fails to respond to PROC_HB_MISSES number of AliveQueries, MON-CV raises an alarm and transitions to an out-of-service state. The PROC_HB_INTERVAL and PROC_HB_MISSES parameters are tuneable.

To track communication status of HADs, MON-CV uses an internal alarm to regularly send them StateQuery heartbeats every HAD_HB_INTERVAL number of seconds. HADs should respond with HadState reports. Upon receipt of a HadState report from HAD, MON-CV updates the communication status of the HAD. The HAD_HB_INTERVAL parameter is tuneable.

MON-CV keeps track of missed StateQuery response. If the currently active HAD fails to respond to HAD_HB_MISSES number of MON-CV's StateQueries, MON-CV immediately notifies the standby HAD to be alert for a possible quick switch-over by sending it a VoteToSwitch notification. If within SWITCH_INTERVAL number of seconds, the voting MON-CV has not detected renewed heartbeats from the non_responding HAD-CurrActy or has not received notice from HAD-Stand of a switch-over underway, then the voting MON-CV will step itself down to a standby status because it cannot inform its RAD critical process of where to direct call flow. The HAD_HB_MISSES and SWITCH INTERVAL parameters are tuneable.

Heartbeat status for a tracked critical process or tracked HAD may be:

ALIVE—if process[HAD] continues to answer AliveQueries [StateQueries] from MON-CV.

MISSED_HTBT—if process[HAD] has failed to respond to one or more successive AliveQueries [StateQueries] up to PROC_HB_MISSES] [HAD_HB_MISSES] number.

NOT_RESPONDING—if process[HAD] has failed to respond to PROC_HB_MISSES [HAD_HB_MISSES] successive AliveQueries [StateQueries], but process is not found to be dead using kill(O).

DEAD—if a non-responding process{HAD] is found to be dead using kill(O). Also, an ImDead report from process{HAD] will cause an immediate transition to this heartbeat status.

MON-CV relies on the following parameters:

HAD_HB_INTERVAL—This is the interval in seconds between StateQuery heartbeats sent by MON-CV to the HADs. The default is 1 second.

HAD_HB_MISSES—This is the number of successive missed responses to StateQueries that MON-CV allows a HAD before declaring it NOT_RESPONDING. The default is 2.

PROC_HB_INTERVAL—This is the interval in seconds between AliveQuery heartbeats sent by MON-CV to RAD. The default is 1 second.

PROC_HB_MISSES—This is the number of successive missed responses to AliveQueries that MON-CV allows RAD before declaring it NOT_RESPONDING. The default is 2.

SWITCH_INTERVAL—This is the number of seconds that MON-CV waits for a switch-over notification or detection of renewed HAD-CurrActy heartbeats following MON-CV's sending of a VoteToSwitch notification to HAD-Stand. If SWITCH_INTERVAL expires with no notifications, the MON-CV steps itself down to standby state.

The following provides a description of MON-CV states and transitions.

MON_OOS:
When MON-CV initializes, it starts in the out-of-service state, MON_OOS. When RAD has initialized and sent an ImAlive declaration, MON-CV transitions to the next standby state.

MON_STANDBY:
In state MON-STANDBY, MON-CV knows that RAD is alive, but RAD's circuits are still OOS. MON-CV is talking to the remote HADs on the call control computers and to RAD. When MON-CV receives an ImController announcement from the HAD going active, MON-CV records the identity so that it may tell RAD which is the current active call control computer. When HAD-CurrActy completes activation and sends MON-CV a GoActive command, MON-CV transitions to the next state and sends RAD a RadGoActive command.

MON_WAIT_RAD_ACTIVE:
In this state, MON-CV is waiting for RAD to answer the RadGoActive command with a RadGoneActive report. When RAD sends this report, the MON-CV transitions to the fully active MON_ACTIVE state.

MON_ACTIVE:
In this state, RAD is processing calls on the CRIS unit and interacting with REM on the call control computer. MON-CV is sending periodic AliveQuery heartbeats to RAD and StateQueries to both HADS, updating communication records and keeping track of missed heartbeat responses. If MON-CV sees that the currently active HAD is not responding to StateQueries, MON-CV will immediately notify the standby HAD (with a VoteToSwitch notification) to be alert for a possible quick switch-over as described above. If such a quick switch-over occurs, the newly activated HAD sends MON-CV an ImController announcement. MON-CV records which is the new HAD-CurrActy and notifies RAD with no change to RAD's current state. At any time in MON_ACTIVE state, if MON-CV sees that RAD is not responding to its AliveQueries, MON-CV will transition down to state MON_OOS and notify the HADS.

MON_WAIT_RAD_OOS:
If MON-CV must step down from active call processing due to receipt of a GoStandby command from UI or HAD, MON-CV first sends RAD a RadGoOos command. When RAD answers with a RadGoneOos report, MON-CV transitions to state MON_STANDBY.

MON_MAINT_STANDBY:
If RAD sends MON-CV a RadGoneMoos report indicating its need for maintenance, MON-CV transitions to MON_MAINT_STANDBY. When RAD must go MOOS, it busies out all CRIS circuits as they become ideal, in anticipation of CRIS shutdown. MON-CV does not try to re-activate RAD if there is a currently active call control computer. RAD can only leave its MOOS state by manual command or re-boot. In all Mon states, MON-CV responds to RAD's ImDead report, RadGoneOos report or to PROC_HB_MISSES number of successively missed heartbeat responses by RAD by transitioning down to a MON_OOS state and sending the HADs a MonGonOos report.

The following Tables 6 to 10 provide a detailed description of the functions of MON-CV in response to certain conditions.

TABLE 6

MON-CV STATE: MON-OOS

| Stimulus | New State | Action |
|---|---|---|
| from RAD: | | |
| ImAlive | MON_STANDBY | Update Rad. status. Tell Had GoneStandby |
| RadGoneActive | | Update Rad.'s state. Alarm "Rad. went ACTIVE unexpectedly" |
| RadGoneMoos | MON_MAINT_STANDBY | Update Rad.'s state. |
| from HAD: | | |
| ImDead | | Ignore. Update Had's state. Mon not yet STANDBY. |
| ImController | | Ignore. Mon not yet STANDBY. |
| periodic check of missed StateQuery responses exceeds threshold for HAD-CurrActy | | Ignore. Update Had's state. Mon not yet STANDBY. |
| GoActive | | Alarm "Mon cannot go ACTIVE from OOS." |
| GoStandby | | Alarm "Mon cannot go STANDBY from OOS." |
| StateQuery | | Send Had MonOos. |

TABLE 7

MON-CV STATE: MON_STANDBY

| Stimulus | New State | Action |
|---|---|---|
| from RAD: | | |
| ImDead | MON_OOS | Update Rad.'s state. Send Had MonGoneOos. |
| RadGoneMoos | MON_MAINT_STANDBY | Update Rad.'s state. Send Had MonGoneMainStandby. |
| periodic check of missed AliveQuery responses exceeds threshold for Rad. | MON_OOS | Update Rad.'s state. Send Had MonGoneOos. |
| from HAD: | | |
| ImDead | | Update Had's state. Mon not yet in the voting business |
| ImController | | Record which is Had-CurrActy. |
| periodic check of missed StateQuery responses exceeds threshold for Had-CurrActy | | Update Had's state. Mon Not yet in the voting business. |
| GoActive | MON_WAIT_RAD_ACTIVE | Record which is Had-CurrActy. Tell Rad. GoActive. Send Had MonGonewaitRadActive. |
| StateQuery | | send Had MonWaitRadActive |

TABLE 8

MON-CV STATE: MON_WAIT_RAD_ACTIVE

| Stimulus | New State | Action |
|---|---|---|
| from RAD: | | |
| ImDead | MON_OOS | Update Rad.'s state. Setid Had MonGoneOos. |
| RadGoneOos | | Update Rad.'s state. Alarm "Rad. went OOS unexpectedly" Tell Rad. GoActive. |
| RadGoneActive | MON_ACTIVE | Update Rad.'s state. Send Had MonGoneActive. |
| periodic check of missed AliveQuery responses exceeds threshold for Rad. | MON_OOS | Update Rad.'s state. Send Had MonGoneOos. |
| from HAD: | | |
| ImDead from Had-CurrActy | | Send Had-Stand VoteToSwitch and begin SWITCH_INVERVAL wait. |
| ImController | | Record Had-CurrActy. Notify Rad. |
| periodic check of missed StateQuery responses exceeds threshold for Had-CurrActy | | Send Had-Stand VoteToSwitch and begin SWITCH_INTERVAL wait. |
| GoStandby | MON_WAIT_RAD_OOS | Tell Rad. GoOos. Send Had MonGoneWaitRadActive. |

TABLE 9

MON-CV STATE: MON_ACTIVE.

| Stimulus | New State | Action |
|---|---|---|
| from RAD: | | |
| ImDead | MON_OOS | Update Rad.'s state. Send Had MonGoneOos. |
| RadGoneOos | MON_STANDBY | Update Rad.'s state. Alarm "Rad. went OOS unexpectedly." Send Had MonGoneStandby. |
| RadGoneMoos | MON_MAINT_STANDBY | Update Rad.'s state. Send Had MonGoneMaintStandby. |
| periodic check of missed AliveQuery responses exceeds threshold for Rad. | MON_OOS | Update Rad.'s state. Send Had MonGoneOos. |
| from HAD: | | |
| ImDead from Had-CurrActy | | Send Had-Stand VoteToSwitch and begin SWITCH_INTERVAL wait. |
| ImController | | Record Had-CurrActy. Notify Rad. |
| periodic check of missed StateQuery responses exceeds threshold for Had | | Send Had-Stand VoteToSwitch and begin SWITCH_INTERVAL wait. |
| GoStandby | MON_WAIT_RAD_OOS | Tell Rad. GoOos. Send Had MonGoneWaitRadOos |
| StateQuery | | Send Had MonStandby. |

TABLE 10

MON-CV STATE: MON_WAIT_RAD_OOS

| Stimulus | New State | Action |
|---|---|---|
| from RAD: | | |
| ImDead | MON_OOS | Update Rad.'s state. Send Had MonGoneOos. |
| RadGoneOos | MON-STANDBY | Update Rad.'s state. Send Had MonGoneStandby |
| RadGoneMoos | MON-MAINT-STANDBY | Update Rad.'s state. Send Had MonGoneMainStandby. |
| periodic check of missed AliveQuery response exceeds threshold for Rad. | MON_OOS | Update Rad.'s state. Send Had MonGoneOos. |
| from HAD. | | |
| ImDead | | Ignore. Mon going STANDBY. |
| ImController | | Ignore. Mon going STANDBY. |
| periodic check of missed StateQuery responses exceeds threshold for Had-CurrActy | | Ignore. Mon going STANDBY. |

In all Mon states, MON-CV responds to RAD's ImDead report, RadGoneOos report or to PROC_HB_MISSES number of successively missed heartbeat responses by RAD by transitioning down to a MON OOS state and sending the HADs a MonGonOos report. In any state, MON answers HAD's StateQueries with a MonState report.

If MON-CV bounces, it re-spawns and reinitializes as though it were undergoing a cold start. MON-CV makes no assumptions about any prior states. Currently, RAD bounces are only acknowledged if MON-CV receives an ImDead report from RAD when RAD is dying gracefully. In that case, MON transitions to state MON_OOS. Once RAD has re-initialized and sent MON-CV an ImAlive report, MON will transition to MON-STANDBY and proceeds as usual.

MON-OP (GTAS)

MON-Op runs as a message-driven state transition engine on the GTAS designed to monitor and coordinate the states of the GTAS's critical processes. MON-Op also keeps a record of the current states of the active and standby HAD monitors on the call control computer. If MON-Op notices any problems in communication with the currently active HAD, it will immediately notify the standby HAD to be alert for a possible switch-over. Because the GTAS can run independently of the rest of the platform, MON-Op needs to have only two states, out-of-service or active.

The Mon-Op message types listed here are named generically for simplicity when used in describing the MON-Op activities and state transitions that follow. Mon-Op receives the following messages:

ImAlive—from both HADs and from GTAS critical processes when they have initialized and from critical processes regularly as a heartbeat to confirm their viability.

ImDead—from both HADs or critical processes when they are going down gracefully.

StateQuery—from both HADs to request a heartbeat response in the form of a state report.

HadState—from both HADs as a heartbeat response and report of current activity level.

ImController—from the HAD going active during initialization or switch-over.

ON-Op sends the following messages:

AliveQuery—to critical processes to request a heartbeat response indicating viability.

StateQuery—to both HADs to request a heartbeat response in the form of a state report.

MonState—to both HADs' as a heartbeat answer indicating viability.

VoteToSwitch—to HAD-Stand when MON-Op has detected a communication problem with the currently active HAD.

To keep a current record of the states of the call control computers, MON-Op uses an internal alarm routine to regularly send the HADs StateQuery heartbeats every HAD_HB_INTERVAL number of seconds. Each HAD should respond with a HadState report. If the currently active HAD fails to respond to HAD_HB_MISSES number of MON-OP's StateQueries, MON-Op immediately notifies the standby HAD to be alert for a possible switch-over by sending it a VoteToSwitch notification. The HAD_HB_INTERVAL and HAD_HB_MISSES parameters are tuneable.

It is worthy to note that because the GTAS runs independently of the rest of the platform, MON-OP does not need to change its state or redirect any call flow upon failure of the HAD-CurrActy, unlike the MON-CV which must take certain action within SWITCH_INTERVAL number of seconds of sending a VoteToSwitch.

HAD's state may be:

HAD_OOS

HAD_STANDBY

HAD_WAIT_MONS

HAD_WAIT_REM

HAD_ACTIVE

To track communication status of critical servers on the GTAS, MON-Op uses the internal alarm to regularly send them AliveQuery heartbeats every PROC_HB_INTERVAL number of seconds. All recipients of MON-Op's AliveQueries should respond with ImAlive reports. MON-Op keeps track of missed AliveQuery responses. If any of its critical processes fails to response to PROC_HB_MISSES number of MON-Op's AliveQueries, then MON-Op raises an alarm and transitions to an out-of-service state. Both PROC_HB_INTERVAL and PROC_HB_MISSES are tuneable parameters.

MON-OP may need to handle multiple instances of the same critical process server. Therefore, the simplifying assumption—that one live instance of an multiply-instanced critical server is "enough" for the platform to maintain active call processing—allows MON-Op to assign an aggregate status of ALIVE to any multiply-instanced process having that one live instance.

The communications status of a tracked process or HAD may have one of the following values:

ALIVE—if process[HAD] continues to answer AliveQueries [State Queries] from MON-op.

MISSED_HTBT—if process[HAD] has failed to respond to one or more successive AliveQueries [StateQueries] up to PROC_HB_MISSES [HAD_HB_MISSES] number.

NOT_RESPONDING—if process {HAD} has failed to respond to PROC_HB_MISSES [HAD_HB_MISSES] successive AliveQueries [State Queries}, but is not found to be dead using kill(O).

DEAD—if a non-responding process[HAD] is found to be dead using kill(O). Also, receipt of an ImDead message from a process will cause an immediate transition to this heartbeat status.

Mon-Op relies on the following parameters:

HAD_HB_INTERVAL—This is the interval in seconds between StateQuery heartbeats sent by MON-op to the HADs. The default is 1 second.

HAD_HB_MISSES—This is the number of successive missed responses to StateQueries that MON-op allows a HAD before declaring it NOT_RESPONDING. The default is 2.

PROC_HB_INTERVAL—This is the interval in seconds between AliveQuery heartbeats sent by MON-Op to its critical processes. The default is 1 second.

PROC_HB_MISSES—This is the number of successive missed responses to AliveQueries that MON-Op allows a critical process before declaring it NOT_RESPONDING. The default is 2.

The following comprises a general description of MON-Op states and transitions.

MON_OOS:

When MON-Op initializes, it starts in the out-of-service state, MON OOS. When each critical process has initialized and send an ImAlive declaration, MON-Op transitions to a fully active state.

MON_ACTIVE:

In this state, MON-Op knows that the GTAS is able to process calls. MON-Op is sending periodic AliveQuery heartbeats to the critical processes and StateQuery heartbeats to the HADs. If MON-Op sees that the currently active HAD is not responding to StateQueries, MON-Op immediately notifies the standby HAD with a VoteToSwitch of the need to be alert for a possible switch-over. If MON-Op sees that a critical process is not responding to its AliveQueries, MON-Op will transition down to state MON-OOS and notify the HADS.

The following Tables 11 and 12 describe in detail the functions of MON-Op in response to certain conditions.

TABLE 11

MON-Op STATE: MON_OOS

| Stimulus | New State | Action |
|---|---|---|
| from critical processes: | | |
| periodic check of received AliveQuery responses shows all critical processes alive | MON_ACTIVE | Send Had MonGoneActive |
| ImDead from last living instance of multiply-instanced critical process or from a singly-instanced critical process | * | Update proc's status Mon-Op already OOS. |
| periodic check of missed AliveQuery responses exceeds threshold for last living instance of multiply-instanced critical process or for a | * | Ignore. Mon-Op already OOS. |

TABLE 11-continued

MON-Op STATE: MON_OOS

| Stimulus | New State | Action |
|---|---|---|
| singly-instanced critical process from HAD: | | |
| ImDead from Had-CurrActy | * | Ignore. Mon-Op not yet in the voting business |
| HadState | * | Update Had's state |
| ImController | * | Ignore. Mon-Op not yet ACTIVE. |
| periodic check of missed StateQuery responses exceeds threshold for Had-CurrActy | * | Ignore. Mon-Op not yet in the voting business |

TABLE 12

MON-Op STATE: MON_ACTIVE

| Stimulus | New State | Action |
|---|---|---|
| from critical processes: | | |
| ImDead from last living instance of multiply-instanced critical process or from singly-instanced critical process | MON_OOS 5 | Send Had MonGonOos. |
| periodic check of missed AliveQuery responses exceeds threshold for last living instance of multiply-instanced critical process or for singly-instanced critical process from HAD: | MON_OOS | |
| ImDead from Had-CurrActy | * | Send Had-Stand VoteToSwitch. |
| HadState | | Update Had's state |
| ImController | * | Record Had-CurrActy. |
| periodic check of missed StateQuery responses exceeds threshold for Had-CurrActy | * | Send Had-Stand VoteToSwitch. |

Although various embodiments are specifically illustrated and described herein, it will be appreciated that modifications and variations of the present invention are covered by the above teachings and within the purview of the appended claims without departing from the spirit and intended scope of the invention. For example, although a pair of call control computers are used for CPP 10, it can be appreciated that any number of call control computers can be used and still fall within the scope of the invention. In addition, although the communications monitoring processes were described with reference to CPP 10, it can be appreciated that these processes can be implemented on other network devices and still fall within the scope of the invention.

What is claimed is:

1. A method for processing call data, comprising the steps of:
   replicating call data from a first server in active mode to a second server in standby mode;
   monitoring said first server by said second server and other network devices for a fault condition; and
   switching said first server to standby mode and said second server to active mode if a fault condition is detected.

2. The method of claim 1, wherein said step of replicating call data comprises the steps of:
   receiving the call data at said first server;
   processing the call data at said first server;
   updating a call data record for said first server to reflect the call data;
   sending the call data to said second server; and
   updating a call data record for said second server to reflect the call data.

3. The method of claim 1, wherein said step of monitoring comprises the steps of:
   querying said first server by said network devices to detect a fault condition; and
   sending a message from said network devices to said second server of a detected fault condition.

4. The method of claim 3, wherein said step of switching comprises the steps of:
   receiving at said second server said messages;
   determining whether said messages reaches a predetermined threshold number, and if so:
   switching said second server from standby mode to active mode; and
   sending a message from said second server to said first server to switch to standby mode.

5. The method of claim 4, further comprising the step of sending a message to said network devices to redirect call data to said second server.

6. The method of claim 1, further comprising the steps of:
   receiving static call data at a database;
   storing said static call data in a static call data profile at said database; and
   replicating said static call data to said first and second servers if said static call data is updated.

7. The method of claim 6, wherein said step of replicating comprises the steps of:
   receiving said static call data at said first and second servers; and
   updating a static call data profile for said first server, and a static call data profile for said second servers.

8. The method of claim 7, further comprising the step of auditing said call data records and said static call data profiles on a periodic basis to ensure data synchronization.

9. A method for processing call data, comprising the steps of:
   receiving the call data at a first server in an active mode;
   processing the call data at said first server;
   updating a call data record for said first server to reflect the call data;
   replicating the call data to a second server in a standby mode;
   monitoring said first server by said second server and other network devices for a fault condition; and
   switching said first server to standby mode and said second server to active mode if a fault condition is detected.

10. The method of claim 9, further comprising the steps of:

receiving the replicated call data at said second server; and updating a call data record for said second server to reflect the replicated call data.

11. The method of claim 10, further comprising the step of sending a message that said first server has switched to standby mode and said second server has switched to active mode.

12. An apparatus for processing calls, comprising:

a first call control computer in active mode for receiving call data;

a second call control computer in standby mode coupled to said first call control computer;

means for replicating said call data from said first call control computer to said second call control computer;

means for monitoring said first call control computer to detect failure of said first call control computer; and means for switching said second call control computer to active mode and said first call control computer to standby mode if said failure occurs.

13. The apparatus of claim 12, further comprising a database coupled to said first and second call control computers.

14. The apparatus of claim 13, wherein said call information comprises static call information and dynamic call information, and said database stores said static information.

15. The apparatus of claim 14, further comprising a means for replicating said static call information on said first and second call control computers.

16. The apparatus of claim 13, wherein said means for replicating replicates static call information on said first and second call control computers whenever said static call information is modified.

17. The apparatus of claim 12, wherein said means for monitoring comprises:

means for remotely monitoring said first and second call control computers; and means for locally monitoring said first and second call control computers.

18. The apparatus of claim 17, wherein said means for locally monitoring comprises:

means for setting said first call control computer in active mode and said second call control computer in standby mode;

means for initializing said first call control computer in active mode;

means for determining whether a set of internal processes within said first call control computer are running within normal parameters; and means for sending a message to said second call control computer to switch from standby mode to active mode if said set of internal processes are not running within normal parameters.

19. The apparatus of claim 17, wherein said means for remotely monitoring comprises:

means for determining whether a set of internal processes within said first call control computer are running within normal parameters; and means for sending a message to said second call control computer voting to switch said second call control computer from standby mode to active mode if said set of internal processes are not running within normal parameters.

20. The apparatus of clam 12, wherein said means for switching comprises:

means for receiving at said second server vote-to-switch messages;

means for determining whether said messages reaches a predetermined threshold number, and if so:

means for switching said second server from standby mode to active mode; and means for sending a message from said second server to said first server to switch to standby mode.

21. The apparatus of claim 20, further comprising means for sending a message to said network devices to redirect call data to said second server.

22. A computer for performing call processing, comprising:

a memory containing:

a computer program for replicating call data from a first server in active mode to a second server in standby mode;

a set of computer programs for monitoring said first server by said second server and other network devices for a fault condition;

a computer program for switching said first server to standby mode and said second server to active mode if a fault condition is detected; and a processor for running said programs.

23. A computer-readable medium whose contents cause a computer system to perform a remote procedure call, the computer system having a computer program that when executed performs the steps of:

replicating call data from a first server in active mode to a second server in standby mode;

monitoring said first server by said second server and other network devices for a fault condition; and switching said first server to standby mode and said second server to active mode if a fault condition is detected.

* * * * *